US012742495B2

United States Patent
(12) United States Patent
Nelson et al.

(10) Patent No.: US 12,742,495 B2
(45) Date of Patent: Sep. 22, 2026

(54) CONTINUOUSLY VARIABLE TRANSMISSION

(71) Applicant: Polaris Industries Inc., Medina, MN (US)

(72) Inventors: Stephen L. Nelson, Osceola, WI (US); Amery D. Kuhl, North Branch, MN (US); Narender Bejawada, Maple Grove, MN (US); Bruce E. Herrala, Monticello, MN (US); David J. Hicke, Chisago City, MN (US); Ryan A. Tholen, Saint Paul, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 0 days.

(21) Appl. No.: 18/645,504

(22) Filed: Apr. 25, 2024

(65) Prior Publication Data

US 2024/0271690 A1 Aug. 15, 2024

Related U.S. Application Data

(63) Continuation of application No. 18/107,329, filed on Feb. 8, 2023, now Pat. No. 12,007,014, which is a (Continued)

(51) Int. Cl.
*F16H 61/66* (2006.01)
*F16H 41/30* (2006.01)

(Continued)

(52) U.S. Cl.
CPC ........... *F16H 57/027* (2013.01); *F16H 41/30* (2013.01); *F16H 57/035* (2013.01);

(Continued)

(58) Field of Classification Search
CPC ........................... F16H 57/0489; F16H 57/035
See application file for complete search history.

(56) References Cited

U.S. PATENT DOCUMENTS

| | | | |
|---|---|---|---|
| 62,016 | A | 2/1867 | Custer |
| 2,145,545 | A | 1/1939 | Johnson et al. |

(Continued)

FOREIGN PATENT DOCUMENTS

| | | | |
|---|---|---|---|
| AU | 2012323853 | A1 | 5/2014 |
| CA | 2851626 | A1 | 4/2013 |

(Continued)

OTHER PUBLICATIONS

"2011 Polaris Ranger RZR XP 900 First Look-Motorcycle USA", www.motorcycle-usa.com/2011/01/article/2011-polaris-ranger-rzr-xp-900-first-look/, Jan. 3, 2011; 10 pages.

(Continued)

*Primary Examiner* — Daniel D Yabut
(74) *Attorney, Agent, or Firm* — SCHWEGMAN LUNDBERG & WOESSNER, P.A.

(57) ABSTRACT

A continuously variable transmission for a vehicle includes a drive clutch, a driven clutch operably coupled to the drive clutch, and a belt extending between the drive and driven clutches. The continuously variable transmission also includes an inner cover and an outer cover removably coupled to the inner cover. At least one of the inner and outer covers includes an air inlet for providing cooling air to the drive and driven clutches and the belt.

11 Claims, 31 Drawing Sheets

Related U.S. Application Data continuation of application No. 16/357,676, filed on Mar. 19, 2019, now Pat. No. 11,649,889.

(60) Provisional application No. 62/644,717, filed on Mar. 19, 2018.

(51) Int. Cl.

| | |
|---|---|
| ***F16H 57/027*** | (2012.01) |
| ***F16H 57/035*** | (2012.01) |
| ***F16H 57/04*** | (2010.01) |
| ***F16H 61/662*** | (2006.01) |
| ***F28F 9/22*** | (2006.01) |
| *F16H 57/023* | (2012.01) |

(52) U.S. Cl.

CPC ..... *F16H 57/0416* (2013.01); *F16H 57/0489* (2013.01); *F16H 61/66* (2013.01); *F16H 61/662* (2013.01); *F28F 9/22* (2013.01); *F16H 2057/0235* (2013.01); *F16H 2061/6607* (2013.01); *F16H 2061/66295* (2013.01); *F16H 2700/02* (2013.01); *F28F 2215/04* (2013.01)

(56) References Cited

U.S. PATENT DOCUMENTS 2,871,715 A * 2/1959 Rieser .................... F16H 57/05
474/45
2,953,032 A 9/1960 Ruess
3,465,827 A 9/1969 Levy et al.
3,467,177 A 9/1969 Hoddinott
3,623,565 A 11/1971 Ward et al.
3,651,506 A 3/1972 Olaf et al.
3,750,129 A 7/1973 Takeno et al.
3,789,684 A 2/1974 Freier
3,861,229 A 1/1975 Domaas
3,943,785 A 3/1976 Percifield
4,319,298 A 3/1982 Davis et al.
4,340,126 A 7/1982 Larson
4,395,249 A 7/1983 Prasad et al.
4,422,498 A 12/1983 Chen
4,493,677 A 1/1985 Ikenoya
4,531,928 A 7/1985 Ikenoya
4,560,369 A 12/1985 Hattori
4,594,537 A 6/1986 Arifian et al.
4,596,537 A 6/1986 Te-Long
4,621,727 A 11/1986 Strader
4,622,865 A 11/1986 Itoh et al.
4,631,977 A 12/1986 Kawashima
4,632,070 A 12/1986 Onda et al.
4,645,028 A 2/1987 Kawashima
4,671,781 A * 6/1987 Tanaka ................ F16H 57/0412
474/93
4,671,782 A 6/1987 Ochiai et al.
4,682,511 A 7/1987 Wittke
4,697,665 A 10/1987 Eastman et al.
4,708,699 A 11/1987 Takano et al.
4,712,629 A 12/1987 Takahashi et al.
4,809,179 A 2/1989 Klingler et al.
4,826,205 A 5/1989 Kouda et al.
4,854,446 A 8/1989 Strader
4,895,555 A 1/1990 Watanabe et al.
4,905,461 A 3/1990 Heuer
4,905,783 A 3/1990 Bober
4,990,126 A 2/1991 Ideta et al.
5,025,686 A 6/1991 Sato et al.
5,052,990 A 10/1991 Sakakibara et al.
5,057,061 A 10/1991 Sakakibara et al.
5,080,639 A 1/1992 Sakakibara et al.
5,086,858 A 2/1992 Mizuta et al.
5,094,652 A 3/1992 Sakakibara et al.
5,152,361 A 10/1992 Hasegawa et al.
5,191,755 A 3/1993 Gryspeerdt
5,233,530 A 8/1993 Shimada et al.
5,282,773 A 2/1994 Gryspeerdt
5,334,103 A 8/1994 Gryspeerdt
5,362,094 A 11/1994 Jensen
5,378,198 A 1/1995 Moroto et al.
5,432,326 A 7/1995 Noblett et al.
5,514,046 A 5/1996 Petersmann et al.
5,536,214 A 7/1996 Akita et al.
5,749,596 A 5/1998 Jensen et al.
5,807,194 A 9/1998 Knutson et al.
5,890,870 A 4/1999 Berger et al.
5,897,287 A 4/1999 Berger et al.
5,976,044 A 11/1999 Kuyama
5,976,054 A 11/1999 Yasuoka
6,047,814 A 4/2000 Alles et al.
6,050,911 A 4/2000 Feuchter et al.
6,120,411 A 9/2000 Booth, Jr.
6,149,540 A 11/2000 Johnson et al.
6,176,796 B1 1/2001 Lislegard
6,182,784 B1 2/2001 Pestotnik
6,189,412 B1 2/2001 Tsubata et al.
6,254,108 B1 7/2001 Germain et al.
6,257,081 B1 7/2001 Gagnon et al.
6,264,577 B1 7/2001 Hutchins
6,267,700 B1 7/2001 Takayama
6,338,688 B1 1/2002 Minami et al.
6,379,278 B1 4/2002 Eguchi et al.
6,383,102 B1 5/2002 Onogi
6,398,680 B1 6/2002 Onogi
6,445,038 B1 9/2002 Tihanyi
6,468,170 B1 10/2002 Ito
6,494,798 B1 12/2002 Onogi
6,657,539 B2 12/2003 Yamamoto et al.
6,669,589 B2 12/2003 Onogi
6,715,602 B1 4/2004 Gartland
6,764,421 B2 7/2004 Onogi
6,820,708 B2 11/2004 Nakamura
6,848,348 B2 2/2005 Liao
6,902,502 B2 6/2005 Murakami et al.
6,908,405 B2 6/2005 Otaki et al.
6,938,508 B1 9/2005 Saagge
6,938,676 B2 9/2005 Lan et al.
6,962,543 B2 11/2005 Roby
6,997,832 B2 2/2006 Onogi
7,002,454 B1 2/2006 Gustafson
7,058,490 B2 6/2006 Kim
7,062,987 B2 6/2006 Yoshida et al.
7,070,527 B1 7/2006 Saagge
7,086,837 B2 8/2006 Kamoshita et al.
7,237,638 B2 7/2007 Ishikawa et al.
7,282,010 B2 10/2007 Iriyama et al.
7,363,999 B2 4/2008 Hastings
7,367,420 B1 5/2008 Sherrod et al.
7,392,893 B2 7/2008 Inomoto et al.
7,407,462 B2 8/2008 Tsukada et al.
7,427,248 B2 9/2008 Chonan
7,438,147 B2 10/2008 Kato et al.
7,454,282 B2 11/2008 Mizuguchi
7,505,842 B2 3/2009 Luh
7,556,576 B2 7/2009 Mochizuki et al.
7,641,588 B2 1/2010 Thomson et al.
7,686,123 B2 3/2010 Ishida
7,688,557 B2 3/2010 Ishioka
7,731,613 B2 6/2010 Ishida et al.
7,744,505 B2 6/2010 Tanaka et al.
7,771,299 B2 8/2010 Mochizuki et al.
7,823,891 B2 11/2010 Bushko et al.
7,901,319 B2 3/2011 Tabata et al.
7,905,803 B2 3/2011 Mochizuki et al.
7,980,972 B1 7/2011 Starkey et al.
8,002,061 B2 8/2011 Yamamura et al.
8,029,395 B2 10/2011 Hokari et al.
8,052,572 B2 11/2011 Unno
8,069,975 B2 12/2011 Wallace
8,104,524 B2 1/2012 Manesh et al.
8,109,308 B2 2/2012 Manesh et al.
8,157,039 B2 4/2012 Melvin et al.
8,176,957 B2 5/2012 Manesh et al.
8,256,563 B2 9/2012 Suzuki et al.
8,381,855 B2 2/2013 Suzuki et al.

(56) References Cited

U.S. PATENT DOCUMENTS

| | | | | |
|---|---|---|---|---|
| 8,382,620 | B2 | 2/2013 | Morita | |
| 8,439,141 | B2 | 5/2013 | Bessho et al. | |
| 8,442,731 | B2 | 5/2013 | Unno | |
| 8,459,397 | B2 | 6/2013 | Bessho et al. | |
| 8,460,138 | B2 | 6/2013 | Unno | |
| 8,517,136 | B2 | 8/2013 | Hurd et al. | |
| 8,534,397 | B2 | 9/2013 | Grajkowski et al. | |
| 8,534,413 | B2 | 9/2013 | Nelson et al. | |
| 8,556,015 | B2 | 10/2013 | Itoo et al. | |
| 8,596,406 | B2 | 12/2013 | Itoo et al. | |
| 8,613,335 | B2 | 12/2013 | Deckard et al. | |
| 8,662,290 | B2 | 3/2014 | Twigger et al. | |
| 8,682,550 | B2 | 3/2014 | Nelson et al. | |
| 8,684,887 | B2 | 4/2014 | Krosschell | |
| 8,746,719 | B2 | 6/2014 | Safranski et al. | |
| 8,834,307 | B2 | 9/2014 | Itoo et al. | |
| 8,840,496 | B2 | 9/2014 | Yamanishi et al. | |
| 8,910,777 | B2 | 12/2014 | Minkin | |
| 8,911,312 | B2 | 12/2014 | Itoo et al. | |
| 8,950,290 | B2 | 2/2015 | Dieter et al. | |
| 8,991,594 | B2 | 3/2015 | Nakamura et al. | |
| 8,997,908 | B2 | 4/2015 | Kinsman et al. | |
| 8,997,952 | B2 | 4/2015 | Getz et al. | |
| 9,027,937 | B2 | 5/2015 | Ryan et al. | |
| 9,108,470 | B2 | 8/2015 | Tercha et al. | |
| 9,151,384 | B2 | 10/2015 | Kohler et al. | |
| 9,162,573 | B2 | 10/2015 | Grajkowski et al. | |
| 9,205,717 | B2 | 12/2015 | Brady et al. | |
| 9,211,924 | B2 | 12/2015 | Safranski et al. | |
| 9,341,255 | B2 | 5/2016 | Itoo et al. | |
| 9,365,251 | B2 | 6/2016 | Safranski et al. | |
| 9,366,331 | B2 | 6/2016 | Eberhardt | |
| 9,429,235 | B2 | 8/2016 | Krosschell et al. | |
| 9,453,573 | B2 | 9/2016 | Renner et al. | |
| 9,566,858 | B2 | 2/2017 | Hicke et al. | |
| 9,665,418 | B2 | 5/2017 | Arnott et al. | |
| 9,695,899 | B2 | 7/2017 | Smith et al. | |
| 9,718,351 | B2 | 8/2017 | Ripley et al. | |
| 9,771,084 | B2 | 9/2017 | Norstad | |
| 9,797,485 | B2 | 10/2017 | Ebihara et al. | |
| 9,802,621 | B2 | 10/2017 | Gillingham et al. | |
| 9,863,523 | B2 | 1/2018 | Stocks et al. | |
| 9,909,659 | B2 | 3/2018 | Bessho et al. | |
| 9,920,810 | B2 | 3/2018 | Smeljanskij et al. | |
| 9,969,259 | B2 | 5/2018 | Safranski et al. | |
| 10,086,698 | B2 | 10/2018 | Grajkowski et al. | |
| 10,183,605 | B2 | 1/2019 | Weber et al. | |
| 10,246,153 | B2 | 4/2019 | Deckard et al. | |
| 10,363,941 | B2 | 7/2019 | Norstad | |
| 10,369,861 | B2 | 8/2019 | Deckard et al. | |
| 10,369,886 | B2 | 8/2019 | Safranski et al. | |
| 10,406,884 | B2 | 9/2019 | Oakden-Graus et al. | |
| 10,578,184 | B2 | 3/2020 | Gilbert et al. | |
| 10,697,532 | B2 | 6/2020 | Schleif et al. | |
| 10,704,640 | B2 | 7/2020 | Galasso et al. | |
| 10,723,408 | B2 | 7/2020 | Pelot | |
| 10,731,724 | B2 | 8/2020 | Laird et al. | |
| 10,774,896 | B2 | 9/2020 | Hamers et al. | |
| 10,780,770 | B2 | 9/2020 | Kohler et al. | |
| 10,933,710 | B2 | 3/2021 | Tong | |
| 10,981,429 | B2 | 4/2021 | Tsiaras et al. | |
| 10,981,448 | B2 | 4/2021 | Safranski et al. | |
| 11,001,120 | B2 | 5/2021 | Cox | |
| 11,148,748 | B2 | 10/2021 | Galasso | |
| 11,162,555 | B2 | 11/2021 | Haugen | |
| 11,192,424 | B2 | 12/2021 | Tabata et al. | |
| 11,279,198 | B2 | 3/2022 | Marking | |
| 11,306,798 | B2 | 4/2022 | Cox et al. | |
| 11,351,834 | B2 | 6/2022 | Cox | |
| 11,413,924 | B2 | 8/2022 | Cox et al. | |
| 11,448,283 | B2 | 9/2022 | Strickland | |
| 11,472,252 | B2 | 10/2022 | Tong | |
| 11,543,005 | B2 | 1/2023 | Zurbruegg et al. | |
| 11,578,793 | B2 | 2/2023 | Nelson et al. | |
| 11,649,889 | B2 | 5/2023 | Nelson et al. | |
| 11,840,142 | B2 | 12/2023 | Safranski et al. | |
| 12,007,014 | B2 | 6/2024 | Nelson et al. | |
| 12,092,198 | B2 | 9/2024 | Nelson et al. | |
| 2002/0028727 | A1 | 3/2002 | Iida et al. | |
| 2002/0125675 | A1 | 9/2002 | Clements et al. | |
| 2003/0029664 | A1* | 2/2003 | Shimizu .............. | F16H 57/0489 180/339 |
| 2003/0096668 | A1 | 5/2003 | Yoshida et al. | |
| 2004/0024515 | A1 | 2/2004 | Troupe et al. | |
| 2004/0026880 | A1 | 2/2004 | Bundy | |
| 2004/0094343 | A1 | 5/2004 | Fukuda | |
| 2004/0097328 | A1 | 5/2004 | Makiyama et al. | |
| 2004/0116245 | A1 | 6/2004 | Yamamoto et al. | |
| 2004/0149049 | A1 | 8/2004 | Kuzik et al. | |
| 2004/0171457 | A1 | 9/2004 | Fuller | |
| 2004/0195019 | A1 | 10/2004 | Kato et al. | |
| 2004/0195034 | A1 | 10/2004 | Kato et al. | |
| 2004/0224806 | A1 | 11/2004 | Chonan | |
| 2004/0262132 | A1 | 12/2004 | Pauley et al. | |
| 2005/0049772 | A1 | 3/2005 | Liu | |
| 2005/0077696 | A1 | 4/2005 | Ogawa | |
| 2005/0096822 | A1 | 5/2005 | Aoki | |
| 2005/0205313 | A1 | 9/2005 | Gilmore et al. | |
| 2005/0217953 | A1 | 10/2005 | Bossard | |
| 2005/0272540 | A1 | 12/2005 | Starkey | |
| 2006/0032690 | A1 | 2/2006 | Inomoto et al. | |
| 2006/0055531 | A1 | 3/2006 | Cook et al. | |
| 2006/0090942 | A1 | 5/2006 | Hastings | |
| 2006/0114452 | A1 | 6/2006 | Schnell | |
| 2006/0137920 | A1 | 6/2006 | Aoki et al. | |
| 2006/0213703 | A1 | 9/2006 | Long | |
| 2006/0229811 | A1 | 10/2006 | Herman et al. | |
| 2006/0270503 | A1 | 11/2006 | Suzuki et al. | |
| 2007/0004552 | A1 | 1/2007 | Matsudaira et al. | |
| 2007/0007742 | A1 | 1/2007 | Allen et al. | |
| 2007/0026982 | A1 | 2/2007 | Aoyama | |
| 2007/0054763 | A1 | 3/2007 | Mochizuki et al. | |
| 2007/0111854 | A1 | 5/2007 | Tabata et al. | |
| 2007/0207884 | A1 | 9/2007 | Unno | |
| 2007/0219030 | A1 | 9/2007 | Ho | |
| 2007/0244619 | A1 | 10/2007 | Peterson | |
| 2007/0260372 | A1 | 11/2007 | Langer | |
| 2008/0035428 | A1 | 2/2008 | Omoto et al. | |
| 2008/0103019 | A1 | 5/2008 | Cronin et al. | |
| 2008/0108463 | A1 | 5/2008 | Unno | |
| 2008/0178838 | A1 | 7/2008 | Ota | |
| 2008/0182713 | A1 | 7/2008 | Asaoka | |
| 2008/0183350 | A1 | 7/2008 | Noguchi | |
| 2008/0183357 | A1 | 7/2008 | Asaoka | |
| 2008/0183359 | A1 | 7/2008 | Sawada | |
| 2008/0194380 | A1 | 8/2008 | Unno | |
| 2008/0215217 | A1 | 9/2008 | Unno | |
| 2008/0257692 | A1 | 10/2008 | Wallace | |
| 2008/0283326 | A1 | 11/2008 | Bennett et al. | |
| 2008/0284124 | A1 | 11/2008 | Brady et al. | |
| 2008/0287256 | A1 | 11/2008 | Unno | |
| 2008/0314676 | A1 | 12/2008 | Ishida | |
| 2008/0319596 | A1 | 12/2008 | Yamada | |
| 2009/0020966 | A1 | 1/2009 | Germain | |
| 2009/0050386 | A1 | 2/2009 | Nobuhira | |
| 2009/0101482 | A1 | 4/2009 | Kusel | |
| 2009/0105039 | A1 | 4/2009 | Sah et al. | |
| 2009/0175863 | A1 | 7/2009 | Kraus et al. | |
| 2009/0239705 | A1 | 9/2009 | Tawara et al. | |
| 2009/0254249 | A1 | 10/2009 | Ghoneim et al. | |
| 2009/0291788 | A1 | 11/2009 | Hokari et al. | |
| 2009/0298627 | A1 | 12/2009 | Johnson et al. | |
| 2009/0308682 | A1 | 12/2009 | Ripley et al. | |
| 2010/0152982 | A1 | 6/2010 | Bowman et al. | |
| 2010/0155170 | A1 | 6/2010 | Melvin et al. | |
| 2010/0167853 | A1* | 7/2010 | Morita ...................... | F16H 9/18 474/144 |
| 2010/0174456 | A1 | 7/2010 | Beaudoin et al. | |
| 2010/0184543 | A1 | 7/2010 | Yamashita et al. | |
| 2010/0280712 | A1 | 11/2010 | Bowman | |
| 2011/0029181 | A1 | 2/2011 | Hyde et al. | |
| 2011/0034279 | A1 | 2/2011 | Yamaguchi et al. | |
| 2011/0059821 | A1 | 3/2011 | Lee et al. | |
| 2011/0070991 | A1 | 3/2011 | Wu et al. | |

(56) References Cited

U.S. PATENT DOCUMENTS

2011/0071712 A1 3/2011 Mizuno et al.
2011/0094818 A1 4/2011 Suzuki et al.
2011/0152020 A1 6/2011 Brind et al.
2011/0160696 A1 6/2011 Hoss
2011/0160969 A1 6/2011 Oguri et al.
2011/0166755 A1 7/2011 Eguchi et al.
2011/0190972 A1 8/2011 Timmons et al.
2011/0240394 A1 10/2011 Hurd et al.
2011/0297462 A1 12/2011 Grajkowski et al.
2011/0297463 A1 12/2011 Grajkowski et al.
2011/0301824 A1 12/2011 Nelson et al.
2011/0301825 A1 12/2011 Grajkowski et al.
2011/0306457 A1 12/2011 Lee et al.
2012/0031693 A1 2/2012 Deckard et al.
2012/0031694 A1 2/2012 Deckard et al.
2012/0035019 A1 2/2012 Martini et al.
2012/0055728 A1 3/2012 Bessho et al.
2012/0055729 A1 3/2012 Bessho et al.
2012/0137828 A1 6/2012 Dieter et al.
2012/0178561 A1 7/2012 Lafreniere et al.
2012/0238384 A1 9/2012 Lee et al.
2012/0289370 A1 11/2012 Yamanishi et al.
2012/0309573 A1 12/2012 Well et al.
2012/0316933 A1 12/2012 Pentland et al.
2012/0323371 A1 12/2012 Ballhausen
2013/0001840 A1 1/2013 Reck
2013/0033070 A1 2/2013 Kinsman et al.
2013/0040771 A1 2/2013 Well et al.
2013/0087403 A1 4/2013 Itoo et al.
2013/0090198 A1* 4/2013 Itoo ........................ F16H 57/03 474/93
2013/0090199 A1 4/2013 Itoo et al.
2013/0092468 A1 4/2013 Nelson et al.
2013/0096785 A1 4/2013 Kohler et al.
2013/0096793 A1 4/2013 Krosschell
2013/0158823 A1 6/2013 Dec
2013/0220766 A1 8/2013 Tadych et al.
2013/0240272 A1 9/2013 Gass et al.
2013/0244819 A1 9/2013 Eo et al.
2014/0038755 A1 2/2014 Ijichi et al.
2014/0131176 A1 5/2014 Minkin
2014/0232082 A1 8/2014 Oshita et al.
2014/0239602 A1 8/2014 Blankenship et al.
2014/0243125 A1 8/2014 Koga et al.
2014/0243134 A1 8/2014 Kucharczyk et al.
2014/0262584 A1 9/2014 Lovold et al.
2014/0342110 A1 11/2014 Zhu et al.
2014/0348671 A1 11/2014 Pagliarin
2015/0011344 A1 1/2015 Ebihara et al.
2015/0024890 A1 1/2015 Eberhardt
2015/0046034 A1 2/2015 Kikuchi
2015/0061275 A1 3/2015 Deckard et al.
2015/0081171 A1 3/2015 Ericksen et al.
2015/0308560 A1 10/2015 Itoo et al.
2015/0308561 A1 10/2015 Itoo et al.
2015/0329141 A1 11/2015 Preijert
2015/0377341 A1 12/2015 Renner et al.
2016/0061088 A1 3/2016 Minnichsoffer et al.
2016/0061314 A1 3/2016 Kuhl et al.
2016/0121905 A1 5/2016 Gillingham et al.
2016/0121924 A1 5/2016 Norstad
2016/0176283 A1 6/2016 Hicke et al.
2016/0176284 A1 6/2016 Nugteren et al.
2016/0176287 A1 6/2016 Ripley et al.
2016/0186841 A1 6/2016 Ebihara et al.
2016/0200164 A1 7/2016 Tabata et al.
2016/0214455 A1 7/2016 Reul et al.
2016/0215878 A1 7/2016 Hatajima
2017/0002920 A1 1/2017 Bessho et al.
2017/0045131 A1 2/2017 Yolitz
2017/0087950 A1 3/2017 Brady et al.
2017/0106747 A1 4/2017 Safranski et al.
2017/0129298 A1 5/2017 Lu et al.
2017/0211467 A1 7/2017 Hall et al.
2017/0254405 A1 9/2017 Ballhausen
2017/0268655 A1 9/2017 Stocks et al.
2017/0343101 A1 11/2017 Yamamoto et al.
2018/0009443 A1 1/2018 Norstad
2018/0037212 A1 2/2018 Beyer
2018/0045301 A1 2/2018 Kato et al.
2018/0126817 A1 5/2018 Russell et al.
2018/0178677 A1 6/2018 Swain et al.
2018/0180163 A1 6/2018 Schleif et al.
2018/0245682 A1 8/2018 Davis
2018/0264902 A1 9/2018 Schroeder et al.
2018/0312025 A1 11/2018 Danielson et al.
2018/0320777 A1 11/2018 Becka et al.
2018/0354336 A1 12/2018 Oakden-Graus et al.
2018/0361853 A1 12/2018 Grajkowski et al.
2019/0093745 A1 3/2019 Younggren et al.
2019/0193501 A1 6/2019 Brady et al.
2019/0210457 A1 7/2019 Galsworthy et al.
2019/0285150 A1 9/2019 Zurbruegg et al.
2019/0285159 A1 9/2019 Nelson et al.
2019/0285160 A1 9/2019 Nelson et al.
2019/0389478 A1 12/2019 Norstad
2020/0016953 A1 1/2020 Oakden-Graus et al.
2020/0096075 A1 3/2020 Lindblad
2020/0108709 A1 4/2020 Kohler et al.
2020/0164742 A1 5/2020 Safranski et al.
2020/0223279 A1 7/2020 Mckeefery
2020/0248793 A1 8/2020 Kuhl et al.
2020/0269648 A1 8/2020 Halper
2020/0282786 A1 9/2020 Lorenz et al.
2021/0031579 A1 2/2021 Booth et al.
2021/0088100 A1 3/2021 Woelfel
2021/0102596 A1 4/2021 Malmborg et al.
2021/0108696 A1 4/2021 Connor
2021/0206263 A1 7/2021 Grajkowski et al.
2021/0300140 A1 9/2021 Ericksen et al.
2021/0379957 A1 12/2021 Tabata et al.
2022/0032708 A1 2/2022 Tabata et al.
2022/0041029 A1 2/2022 Randall et al.
2022/0056976 A1 2/2022 Anderson
2022/0082167 A1 3/2022 Kuhl et al.
2022/0088988 A1 3/2022 Menden et al.
2022/0243810 A1 8/2022 Truskolaski et al.
2022/0397194 A1 12/2022 Kohler et al.
2023/0019039 A1 1/2023 Kuhl et al.
2023/0083658 A1 3/2023 Nelson et al.
2023/0184318 A1 6/2023 Nelson et al.
2024/0401688 A1 12/2024 Nelson et al.

FOREIGN PATENT DOCUMENTS

CA 2807101 A1 8/2013
CA 2965309 A1 5/2016
CN 101372930 A 2/2009
CN 101382193 A 3/2009
CN 101960175 A 1/2011
CN 103032535 A 4/2013
CN 103476621 A 12/2013
CN 103486233 A 1/2014
CN 103912664 A 7/2014
CN 103857576 B 8/2017
CN 107002859 A 8/2017
CN 107406094 A 11/2017
CN 107521449 A 12/2017
CN 107521499 A 12/2017
CN 120576227 A 9/2025
DE 4328551 3/1994
DE 10231210 A1 1/2004
EP 0421241 A2 4/1991
EP 0829383 A2 3/1998
EP 1022169 A2 7/2000
EP 1238833 A1 9/2002
EP 1865227 A1 12/2007
EP 2131074 A1 12/2009
EP 3150454 A1 4/2017
GB 2377415 A 1/2003
JP 59-009365 A 1/1984
JP 59-077924 5/1984
JP 2009-228708 A 10/2009
JP 2011-069457 A 4/2011

(56) References Cited

FOREIGN PATENT DOCUMENTS

| | | | |
|---|---|---|---|
| JP | 5977924 | | 7/2016 |
| JP | 5990365 | B2 | 9/2016 |
| WO | 98/50248 | A1 | 11/1998 |
| WO | 2014/059258 | A1 | 4/2014 |
| WO | 2016/069405 | A2 | 5/2016 |
| WO | 2017/187411 | A1 | 11/2017 |
| WO | 2018/118470 | A1 | 6/2018 |
| WO | 2019/126485 | A1 | 6/2019 |

OTHER PUBLICATIONS

"Alba Racing Belt Gauge", www.Maverick-forums.net; 8 pages.
"The Avid Off Racing BITD/SCORE factory Can Am Maverick race build", www.Maverickforums.net; Dec. 13, 2016; 31 pages.
"UTVOutpost.com-UTV Side by Side Parts, Accessories & Videos", http://www.utvoutpost.com/new-can-am-maverick-belt-cover-back-plate-transmission-clutch-cover-420612313; 13 pages.
Amended claims submitted to the European Patent Office on May 5, 2014, in related European Patent Application No. 12787562.3 (Publication No. EP2766238); 9 pages.
Communication pursuant to Article 94(3) EPC issued by the European Patent Office, dated Mar. 27, 2020, for European Patent Application No. 16198993.4; 5 pages.
Decision Institution of Inter Partes Review 37 CFR .sctn. 42.108 issued by the U.S. Patent and Trademark Office Trial and Appeal Board, *Arctic Cat, Inc.* v. *Polaris Industries Inc*., Feb. 3, 2016; 34 pages.
Decision to Institute 37 C.F.R. . sctn. 42.108 issued by the U.S. Patent and Trademark Office Trial and Appeal Board, *Arctic Cat, Inc*. v. *Polaris Industries, Inc*., Feb. 3, 2016; 22 pages.
European Search Report issued by the European Patent Office, dated Mar. 2, 2017, for related European patent application No. 16198993. 4; 11 pages.
Examination Report issued by the Intellectual Property India, dated Jun. 10, 2019, for Indian Patent Application No. 3632/DELNP/2014; 7 pages.
Gangadurai et al.; Development of control strategy for optimal control of a continuously variable transmission operating in combination with a throttle controlled engine; SAE International; Oct. 12, 2005.
http://www.hilliardcorp.com/centrifugal-clutch.html, Motion Control Division, Centrifugal Clutches, accessed Jan. 8, 2013.
International Preliminary Report on Patentability issued by the European Patent Office, dated Feb. 6, 2014, for International Application No. PCT/US2012/060269; 22 pages.
International Preliminary Report on Patentability issued by the International Bureau of WIPO, dated Jun. 25, 2019, for International Patent Application No. PCT/US2017/065520; 8 pages.
International Preliminary Report on Patentability received for PCT Patent Application No. PCT/US19/22912, mailed on Apr. 2, 2020, 24 pages.
International Preliminary Report on Patentability received for PCT Patent Application No. PCT/US2017/065520, mailed on Jul. 4, 2019, 9 pages.
International Preliminary Report on Patentability received for PCT Patent Application No. PCT/US2019/022706, mailed on Mar. 31, 2020, 16 pages.
International Preliminary Report on Patentability received for PCT Patent Application No. PCT/US2022/014291, mailed on Aug. 10, 2023, 8 pages.
International Preliminary Report on Patentability, issued by the European Patent Office, dated Apr. 14, 2015, for International Patent Application No. PCT/US2013/064516; 18 pages.
International Search Report and Written Opinion issued by the European Patent Office, dated Jul. 17, 2013, for International Application No. PCT/US2012/060269; 18 pages.
International Search Report and Written Opinion of the International Searching Authority, mailed Mar. 25, 2014, for International Patent Application No. PCT/US2013/064516; 23 pages.
International Search Report and Written Opinion received for PCT Patent Application No. PCT/US2022/014291, mailed on Jun. 21, 2022, 15 pages.
International Search Report and Written Opinion received for PCT Patent Application No. PCT/US19/22912, mailed on Jun. 20, 2019, 14 pages.
International Search Report and Written Opinion received for PCT Patent Application No. PCT/US2019/022706, mailed on May 17, 2019, 6 pages.
Non-final Office Action mailed Apr. 9, 2015, in corresponding U.S. Appl. No. 13/652,289; 19 pages.
Office Action issued by the Canadian Intellectual Property Office, dated Jul. 26, 2018, for Canadian Patent Application No. 2,851,626; 4 pages.
Office Action issued by the Canadian Intellectual Property Office, dated Jul. 8, 2020, for Canadian Patent Application No. 3,046,825; 5 pages.
U.S. Appl. filed Oct. 15, 2012, Primary Clutch Electronic CVT., U.S. Appl. No. 13/652,304, U.S. Appl. No. 13/652,304.
U.S. Appl. No. 13/399,422, filed with the U.S. Patent Office on Feb. 17, 2012, and issued as U.S. Pat. No. 8,534,413 on Sep. 17, 2013; 33 pages.
U.S. Appl. No. 13/652,253, filed with the U.S. Patent Office on Oct. 15, 2012, and issued as U.S. Pat. No. 8,682,550 on Mar. 25, 2014; 59 pages.
U.S. Appl. No. 13/652,278, filed with the U.S. Patent Office on Oct. 15, 2012, and issued as U.S. Pat. No. 8,684,887 on Apr. 1, 2014; 59 pages.
U.S. Appl. No. 13/652,297, filed with the U.S. Patent Office on Oct. 15, 2012, and issued as U.S. Pat. No. 9,151,384 on Oct. 6, 2015; 59 pages.
U.S. Appl. No. 13/652,289, filed with the U.S. Patent Office on Oct. 15, 2012; 60 pages.
Unno et al.; Development of Electronically Controlled DVT Focusing on Ride's Intention of Acceleration and Deceleration; SAE International; Oct. 30, 2007.
"Chinese Application Serial No. 201980017205.1, Decision of Reexamination mailed Mar. 4, 2025", With English Machine Translation, 32 pgs.
"U.S. Appl. No. 16/357,676, Preliminary Amendment filed Mar. 21, 2019", 3 pgs.
"International Application Serial No. PCT US2017 065520, International Search Report mailed Mar. 19, 2018", 3 pgs.
"International Application Serial No. PCT US2017 065520, Written Opinion mailed Mar. 19, 2018", 7 pgs.
"U.S. Appl. No. 16/357,676, Non Final Office Action mailed Sep. 16, 2021", 12 pgs.
"U.S. Appl. No. 16/357,676, Response filed Dec. 16, 2021 to Non Final Office Action mailed Sep. 16, 2021", 8 pgs.
"U.S. Appl. No. 16/357,676, Final Office Action mailed Mar. 4, 2022", 15 pgs.
"U.S. Appl. No. 16/357,676, Response filed May 4, 2022 to Final Office Action mailed Mar. 4, 2022", 10 pgs.
"U.S. Appl. No. 16/357,676, Advisory Action mailed May 16, 2022", 3 pgs.
"U.S. Appl. No. 16/357,676, Non Final Office Action mailed Jun. 7, 2022", 12 pgs.
"U.S. Appl. No. 16/357,676, Response filed Aug. 31, 22 to Non Final Office Action mailed Jun. 7, 2022", 8 pgs.
"U.S. Appl. No. 16/357,676, Final Office Action mailed Nov. 28, 2022", 8 pgs.
"Decision to Institute 37 C.F.R 42.108 issued by the U.S. Patent and Trademark Office Trial and Appeal Board, *Arctic Cat, Inc* v *Polaris industries Inc*., Feb. 3, 2016", (Feb. 3, 2016), 22 pages.
"U.S. Appl. No. 16/357,676, Response filed Dec. 15, 2022 to Final Office Action mailed Nov. 28, 2022", 7 pgs.
"U.S. Appl. No. 16/357,676, Notice of Allowance mailed Jan. 11, 2023", 8 pgs.
"U.S. Appl. No. 16/357,676, Supplemental Notice of Allowability mailed Jan. 19, 2023", 2 pgs.
"U.S. Appl. No. 18/107,329, Preliminary Amendment filed Feb. 8, 2023", 6 pgs.

(56) References Cited

OTHER PUBLICATIONS

"U.S. Appl. No. 16/357,695, Preliminary Amendment filed Mar. 21, 2019", 3 pgs.
"UTVOutpostcom-UTV Side by Side Parts, Accessories and Videos", [Online]. Retrieved from the Internet: URL: http: www. utvoutpostcom new-can-am-maverick-belt-cover-back-plate-transmission-clutchcover-420612313, (Jun. 29, 2015), 13 pages.
"U.S. Appl. No. 16/357,695, Restriction Requirement mailed Nov. 15, 2021", 5 pgs.
"U.S. Appl. No. 16/357,695, Response filed Jan. 11, 2022 to Restriction Requirement mailed Nov. 15, 2021", 7 pgs.
"U.S. Appl. No. 16/357,695, Non Final Office Action mailed Feb. 22, 2022", 19 pgs.
"U.S. Appl. No. 16/357,695, Response filed May 23, 2022 to Non Final Office Action mailed Feb. 22, 2022", 11 pgs.
"U.S. Appl. No. 16/357,695, Non Final Office Action mailed Jun. 23, 2022", 23 pgs.
"U.S. Appl. No. 16/357,695, Response filed Sep. 16, 2022 to Non Final Office Action mailed Jun. 23, 2022", 9 pgs.
"U.S. Appl. No. 16/357,695, Examiner Interview Summary mailed Sep. 22, 2022", 2 pgs.
"U.S. Appl. No. 16/357,695, Notice of Allowance mailed Oct. 6, 2022", 8 pgs.
"U.S. Appl. No. 18/806,309, Preliminary Amendment filed Aug. 15, 2024", 8 pgs.
"U.S. Appl. No. 18/107,329, Non Final Office Action mailed Aug. 17, 2023", 11 pgs.
"U.S. Appl. No. 18/107,329, Response filed Nov. 2, 2023 to Non Final Office Action mailed Aug. 17, 2023", 7 pgs.
"U.S. Appl. No. 18/107,329, Notice of Allowance mailed Feb. 8, 2024", 11 pgs.
"U.S. Appl. No. 18/053,650, Non Final Office Action mailed Feb. 12, 2024", 9 pgs.
"U.S. Appl. No. 18/053,650, Response filed Apr. 25, 2024 to Non Final Office Action mailed Feb. 12, 2024", 7 pgs.
"U.S. Appl. No. 18/053,650, Notice of Allowance mailed May 15, 2024", 7 pgs.
Amos, Ignore, "The Avid Off Racing BITD Score factory Can Am Maverick Race Build", [Online]. Retrieved from the Internet: https: www.maverickforums.net threads the-avid-off-racing-bitd-score-factory-can-am-maverick-race-build.1145 , (Dec. 13, 2016), 15 pgs.

* cited by examiner

44'
45
A
112'
A
A
110'
46'
A
A
A
48'
A
A
126
A
A
A
124
122
A
A
A
116
A
113'
A
120
A
A
A
A
42'
50a'
46a'
A

CONTINUOUSLY VARIABLE TRANSMISSION

CROSS-REFERENCE TO RELATED APPLICATIONS

The present application is a continuation of U.S. patent application Ser. No. 18/107,329, filed Feb. 8, 2023, which is a continuation of U.S. patent application Ser. No. 16/357,676, filed Mar. 19, 2019, now U.S. Pat. No. 11,649,889, which claims priority to U.S. Provisional Patent Application Ser. No. 62/644,717, filed Mar. 19, 2018, the complete disclosures of which are expressly incorporated by reference herein.

FIELD OF THE DISCLOSURE

The present invention relates generally to a transmission for a vehicle and, in particular, to ducting for a continuously variable transmission on a utility vehicle.

BACKGROUND OF THE DISCLOSURE

Some vehicles such as utility vehicles, all-terrain vehicles, tractors, and others include a continuously variable transmission ("CVT"). The CVT includes a drive clutch, a driven clutch, and a belt configured to rotate between the drive and driven clutches. The position of the drive and driven clutches may be moved between a plurality of positions when the vehicle is operating.

Available space is often limited around the CVT which may make it difficult to service various component of the CVT, for example the belt. Additionally, the intake duct and the exhaust duct of the CVT must be positioned to receive appropriate air flow to cool the components within a housing of the CVT. Therefore, it is necessary to appropriately configure a CVT for sufficient air flow within the housing and for ease of serviceability and maintenance.

SUMMARY OF THE DISCLOSURE

In one embodiment of the present disclosure, a continuously variable transmission ("CVT") for a vehicle comprises a drive clutch, a driven clutch operably coupled to the drive clutch, and a housing generally surrounding the drive and driven clutches. The housing includes an inner cover having a first air inlet and an outer cover removably coupled to the inner cover and having a second air inlet.

In another embodiment of the present disclosure, a powertrain assembly for a vehicle comprises a prime mover, a shiftable transmission operably coupled to the prime mover, and a continuously variable transmission ("CVT") operably coupled to the prime mover and the shiftable transmission. The CVT comprises a drive clutch, a driven clutch operably coupled to the drive clutch, a belt extending between the drive and driven clutches, and a housing generally surrounding the drive and driven clutches. The housing includes an inner cover and an outer cover removably coupled to the inner cover. The powertrain assembly further comprises a bearing housing positioned intermediate a portion of the prime mover and the CVT and which is removably coupled to the CVT and removably coupled to at least one of the prime mover and the shiftable transmission.

In a further embodiment of the present disclosure, a continuously variable transmission ("CVT") for a vehicle comprises a drive clutch, a driven clutch operably coupled to the drive clutch, and a housing generally surrounding the drive and driven clutches. The housing includes an inner cover and an outer cover removably coupled to the inner cover. A radial distance between a peripheral surface of the inner cover and a radially-outermost surface of the driven clutch increases in a direction of air flow.

A continuously variable transmission ("CVT") for a vehicle comprises drive clutch including a moveable sheave and a stationary sheave, a driven clutch operably coupled to the drive clutch and including a moveable sheave and a stationary sheave, and a housing generally surrounding the drive and driven clutches. The housing includes a single air inlet and a single air outlet. The housing is configured to flow air from a position adjacent the stationary sheave of the driven clutch to a position adjacent the stationary sheave of the drive clutch.

A continuously variable transmission ("CVT") for a vehicle comprises a drive clutch and a driven clutch operably coupled to the drive clutch. The driven clutch includes a moveable sheave and a stationary sheave, and the stationary sheave includes a plurality of fins extending axially outward and an angular distance between adjacent fins of the plurality of fins is less than 15 degrees.

A continuously variable transmission ("CVT") for a vehicle comprises a drive clutch including a moveable sheave and a stationary sheave and a driven clutch operably coupled to the drive clutch and including a moveable sheave and a stationary sheave. The CVT further comprises a housing generally surrounding the drive and driven clutches and including an inner cover and an outer cover. The inner cover includes at least one volute and a channel configured to cooperate with the at least one volute to direct air within the housing toward the driven clutch.

A continuously variable transmission ("CVT") for a vehicle comprises a drive clutch including a moveable sheave and a stationary sheave and a driven clutch operably coupled to the drive clutch and including a moveable sheave and a stationary sheave. The CVT further comprises a housing generally surrounding the drive and driven clutches and including an inner cover and an outer cover. The outer cover includes a channel configured to direct air toward the drive clutch.

A continuously variable transmission ("CVT") for a vehicle comprises a drive clutch including a moveable sheave and a stationary sheave and a driven clutch operably coupled to the drive clutch and including a moveable sheave and a stationary sheave. The CVT further comprises a housing generally surrounding the drive and driven clutches and including an inner cover and an outer cover. A distance between an outermost surface of the stationary sheave of the driven clutch and an innermost surface of the outer cover is approximately constant along a portion of the outer cover.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Figure 12:
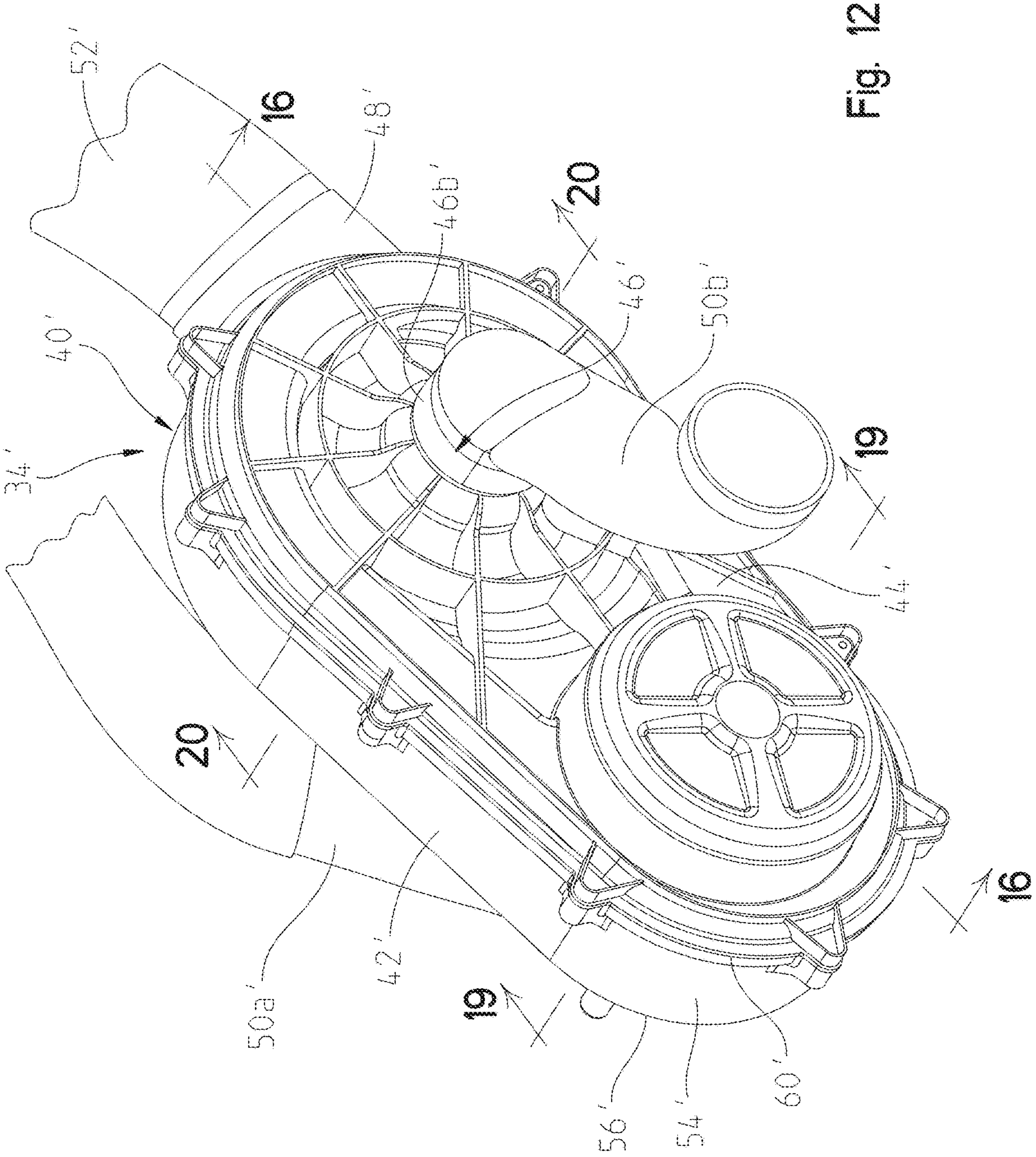
FIG. 12 is a front perspective view of a CVT of the powertrain assembly of FIG. 11A.
Figure 20:
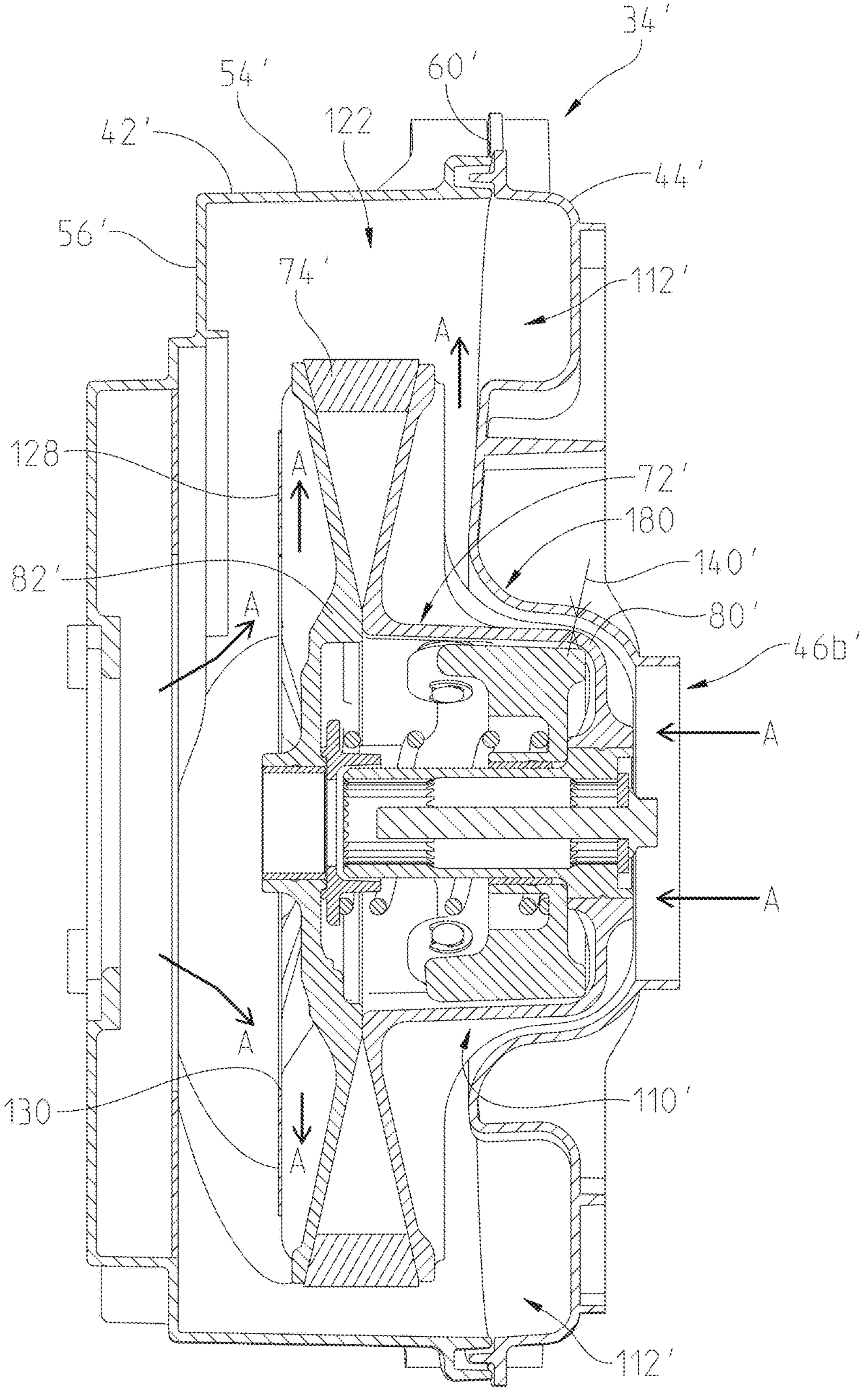

FIG. 20 is a cross-sectional view of the CVT of FIG. 12, taken along line 20-20 of FIGS. 12.

Corresponding reference characters indicate corresponding parts throughout the several views. Unless stated otherwise the drawings are proportional.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to any vehicle with one or more ground-engaging members and a continuously variable transmission, including, but not limited to, all-terrain vehicles, motorcycles, snowmobiles, scooters, three-wheeled vehicles, and golf carts.

Figure 1:
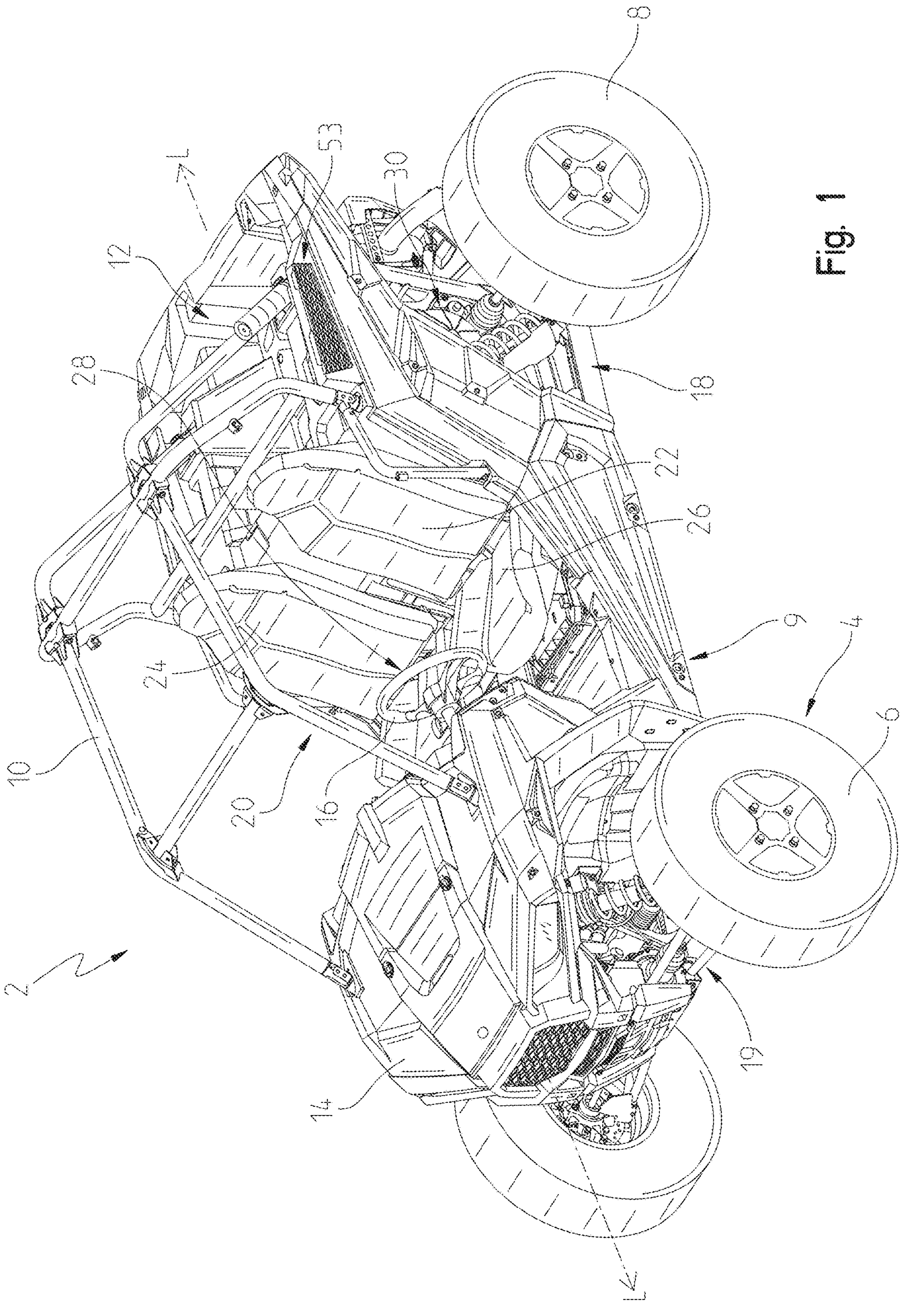
FIG. 1 is a front left perspective view of a utility vehicle of the present disclosure.

Referring to FIG. 1, an illustrative embodiment of a utility vehicle 2 is shown. Vehicle 2 is configured for off-road operation. Vehicle 2 includes a plurality of ground-engaging members 4, illustratively front wheels 6 and rear wheels 8. In one embodiment, one or more of ground-engaging members 4 may be replaced with tracks, such as the Prospector II Tracks available from Polaris Industries, Inc., located at 2100 Highway 55 in Medina, MN 55340 or non-pneumatic tires, such as those shown in U.S. Pat. Nos. 8,176,957 and 8,104,524, the complete disclosures of which are expressly incorporated herein by reference.

Vehicle 2 further includes a lower frame assembly supported by ground-engaging members 4, which extends along a longitudinal axis L of vehicle 2. Additionally, in one embodiment, vehicle 2 may include an upper frame assembly 10 extending vertically above the lower frame assembly, however, alternative embodiments of vehicle 2 may not include upper frame assembly 10. The lower frame assembly supports a rear cargo area 12 and a vehicle body 14, which includes a plurality of body panels.

Vehicle 2 also includes an open-air operator area 20 which, illustratively, includes seating 22 for one or more passengers. As such, operator area 20 is exposed to ambient air and is not fully enclosed. Alternatively, vehicle 2 may include a cab assembly (not shown), such as a roof, front windshield, rear windshield, and doors, to enclose operator area 20. Upper frame assembly 10 may be positioned generally around operator area 20 such that seating 22 is at least partially surrounded by upper frame assembly 10. Illustratively, seating 22 includes an operator seat and a passenger seat, however, seating 22 may also include rear seats for additional passengers or may include only a single seat for carrying the operator. Seating 22 may include a seat back 24 and a seat bottom 26.

Operator area 20 further includes a plurality of operator controls 28, such as a steering wheel 16, by which an operator may provide inputs for operating vehicle 2. Various operator controls, including the steering assembly, may be further described in International Patent Application No. PCT/US13/64516, filed on Oct. 11, 2013, the complete disclosure of which is expressly incorporated by reference herein.

Referring still to FIG. 1, vehicle 2 includes a rear suspension assembly 18 and a front suspension assembly 19, both supported by the lower frame assembly. Additional details of rear and front suspension assemblies 18, 19 may be disclosed in U.S. Pat. No. 9,566,858, issued on Feb. 14, 2017 and U.S. Patent Application Ser. No. 62/608,952, filed Dec. 21, 2017, the complete disclosures of which are expressly incorporated by reference herein.

Figure 2:
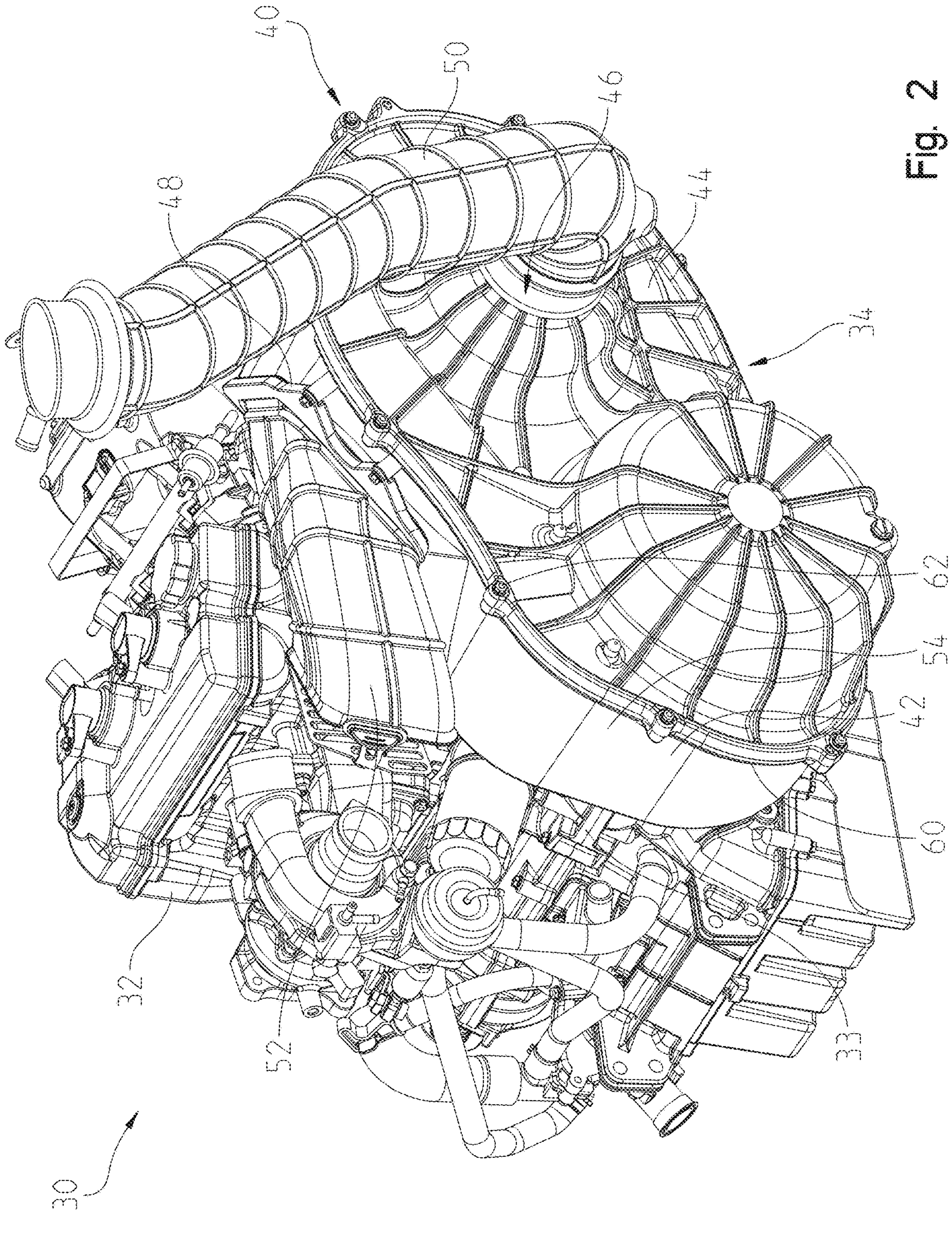
FIG. 2 is a front perspective view of a powertrain assembly of the vehicle of FIG. 1.
Figure 3A:
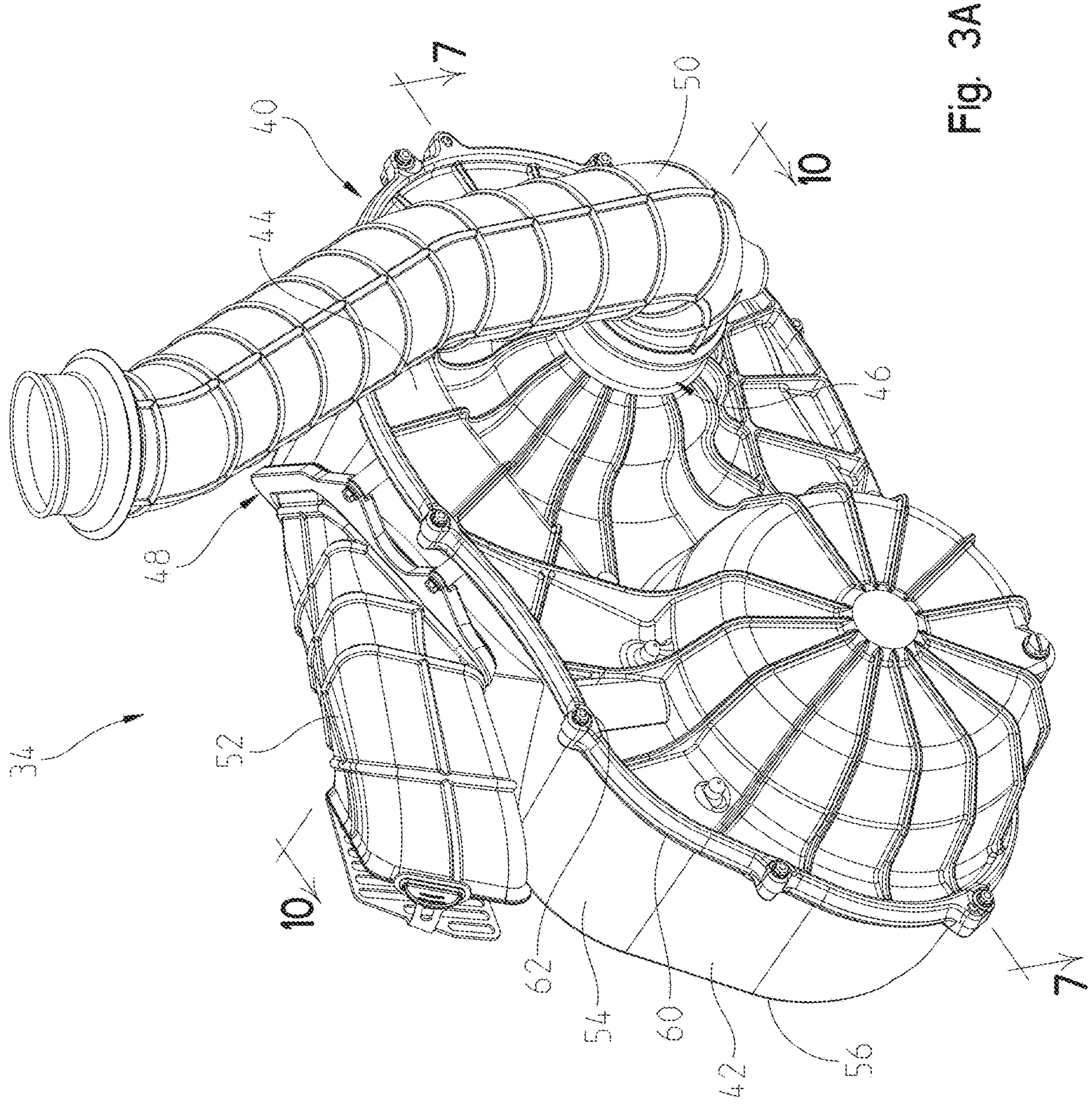
FIG. 3A is a front perspective view of a continuously variable transmission ("CVT") of the powertrain assembly of FIG. 2.
Figure 3B:
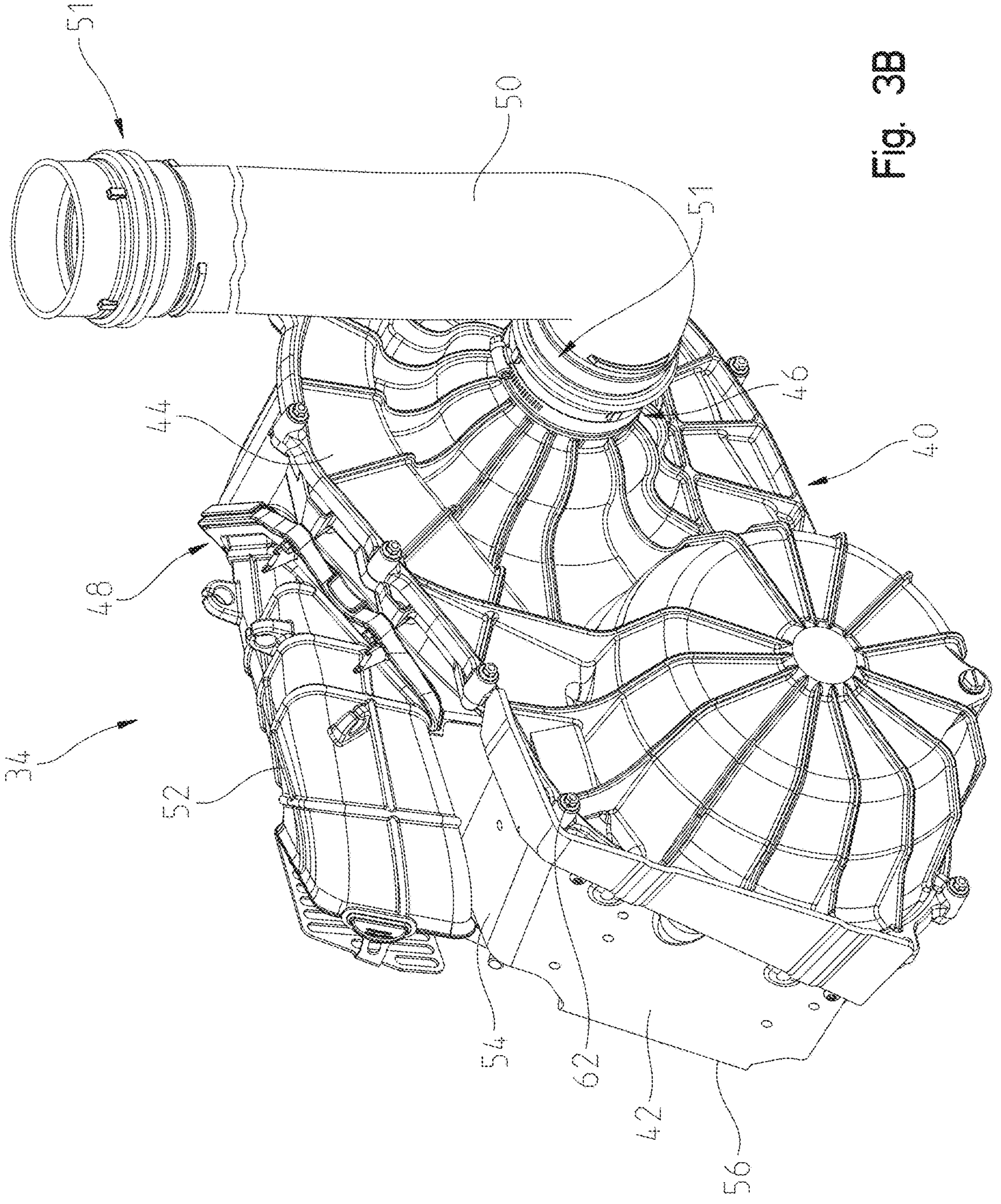
FIG. 3B is a front perspective view of the CVT of FIG. 3A with an alternative outer cover or housing and an alternative intake duct.

Referring to FIG. 2, vehicle 2 further includes a powertrain assembly 30 which is supported by the lower frame assembly and includes at least a prime mover, illustratively an engine 32, a geartrain (not explicitly shown) which may be configured as a shiftable transmission, and a continuously variable transmission ("CVT") 34. Engine 32 is positioned rearward of operator area 20. While the prime mover is disclosed as engine 32, the prime mover may be any type of device configured to provide power to vehicle 2, such as an electric motor, a fuel-based engine, a hybrid engine, a generator, etc. In one embodiment, CVT 34 also is positioned at least partially rearward of operator area 20. As shown in FIG. 2, CVT 34 is positioned laterally outward from or to the side of engine 32 in a direction generally perpendicular to a longitudinal axis L of vehicle 2 (FIG. 1) and extends generally parallel to longitudinal axis L. More particularly, CVT 34 is positioned along the left side of vehicle 2. In alternative embodiments, CVT 34 may extend in a generally perpendicular direction relative to longitudinal axis L or may be configured in any orientation relative to longitudinal axis L, engine 32, and the geartrain. For example, in one embodiment, CVT 34 may be positioned longitudinally forward of engine 32 and configured to extend laterally in a direction generally perpendicular to longitudinal axis L.

Figure 4A:
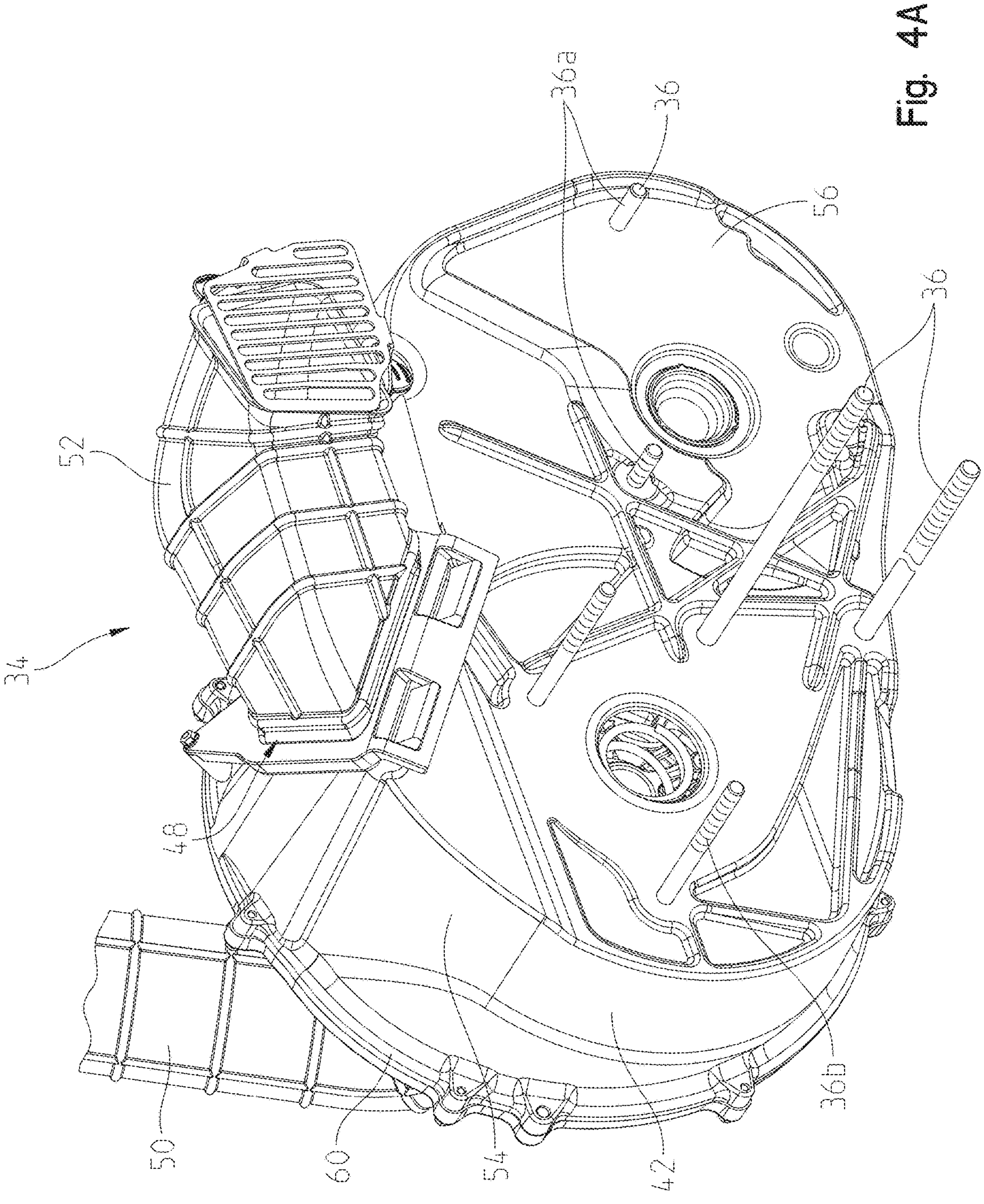
FIG. 4A is a rear perspective view of the CVT of FIG. 3A.

As shown in FIG. 4A, CVT 34 is coupled to both engine 32 and the geartrain with mounting posts or fasteners 36 which are received within mounting bosses (not shown) on a crankcase 33 (FIG. 2) of engine 32 and the housing or transmission case of the geartrain. More particularly, and as shown in FIG. 4A, fasteners **36*a* are received within the mounting bosses on engine 32 and fasteners 36*b* couple CVT 34** to the geartrain.

Figure 6A:
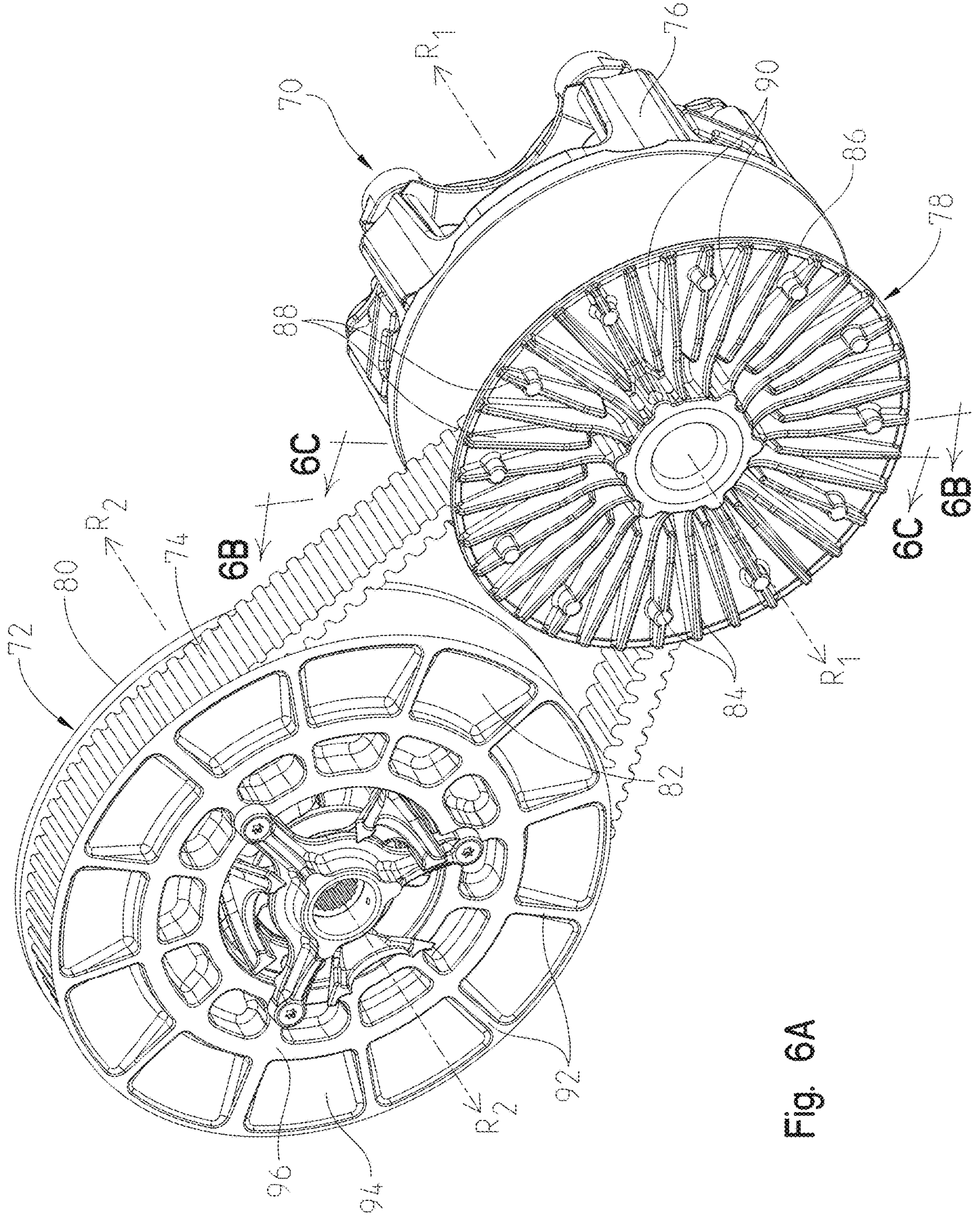
FIG. 6A is a front right perspective view of a drive clutch, a driven clutch, and a belt of the CVT of FIG. 5.
Figure 6B:
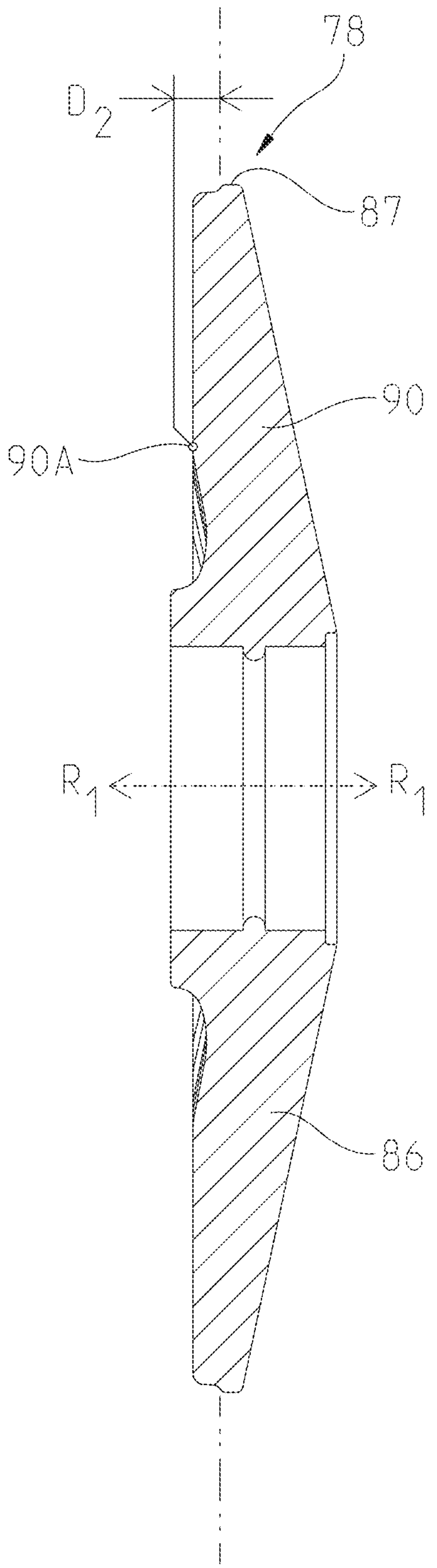
FIG. 6B is a cross-sectional view of a plurality of fins of the drive clutch, taken through line 6B-6B of FIG. 6A.
Figure 6C:
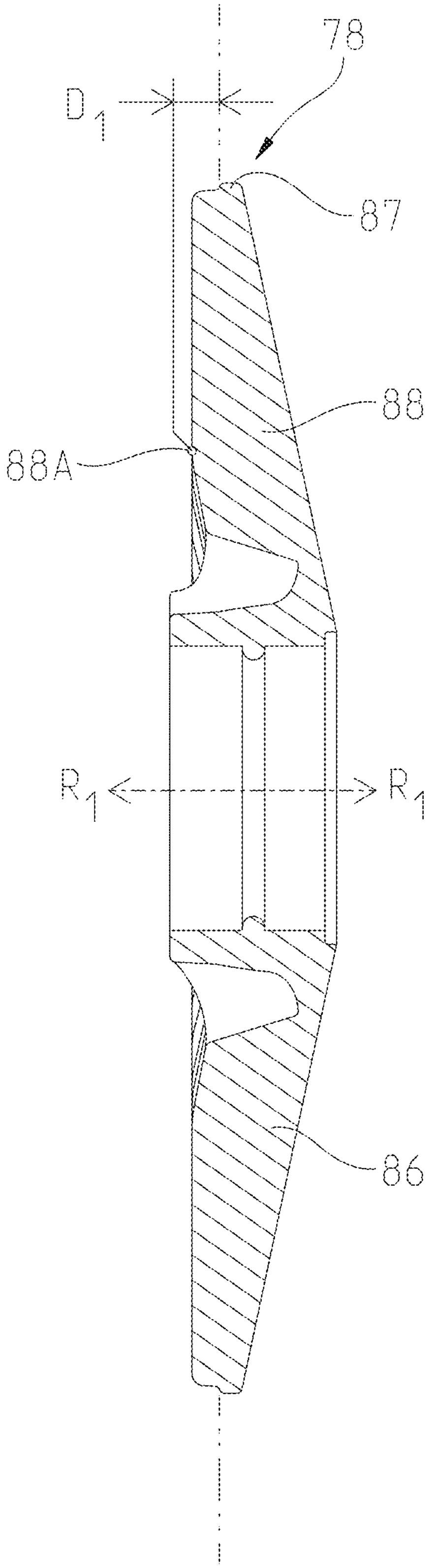
FIG. 6C is another cross-sectional view of another plurality of fins of the drive clutch, taken through line 6C-6C of FIG. 6A.
Figure 7:
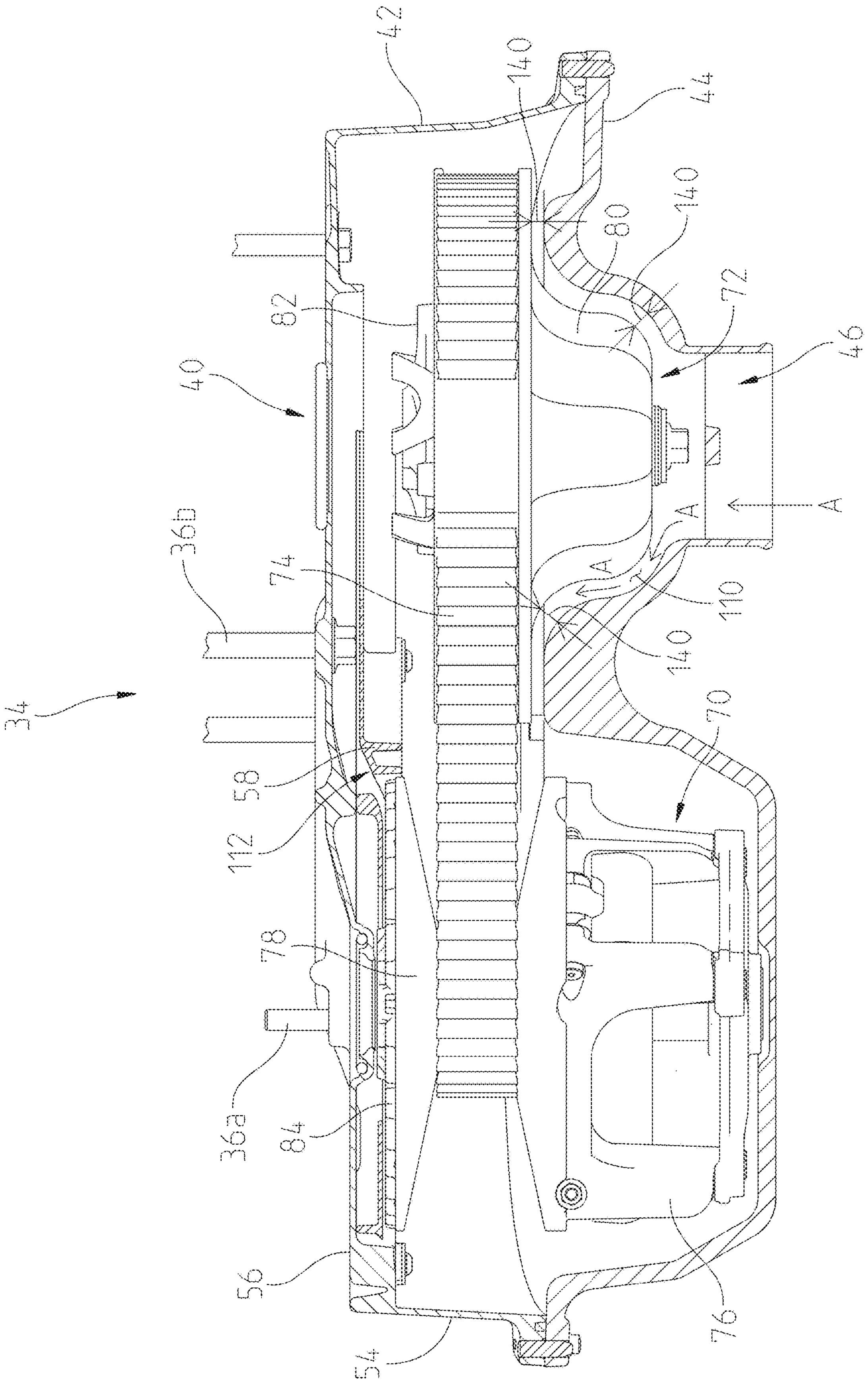
FIG. 7 is a cross-sectional view of the CVT of FIG. 3A, taken along line 7-7 of FIG. 3A.
Figure 8:
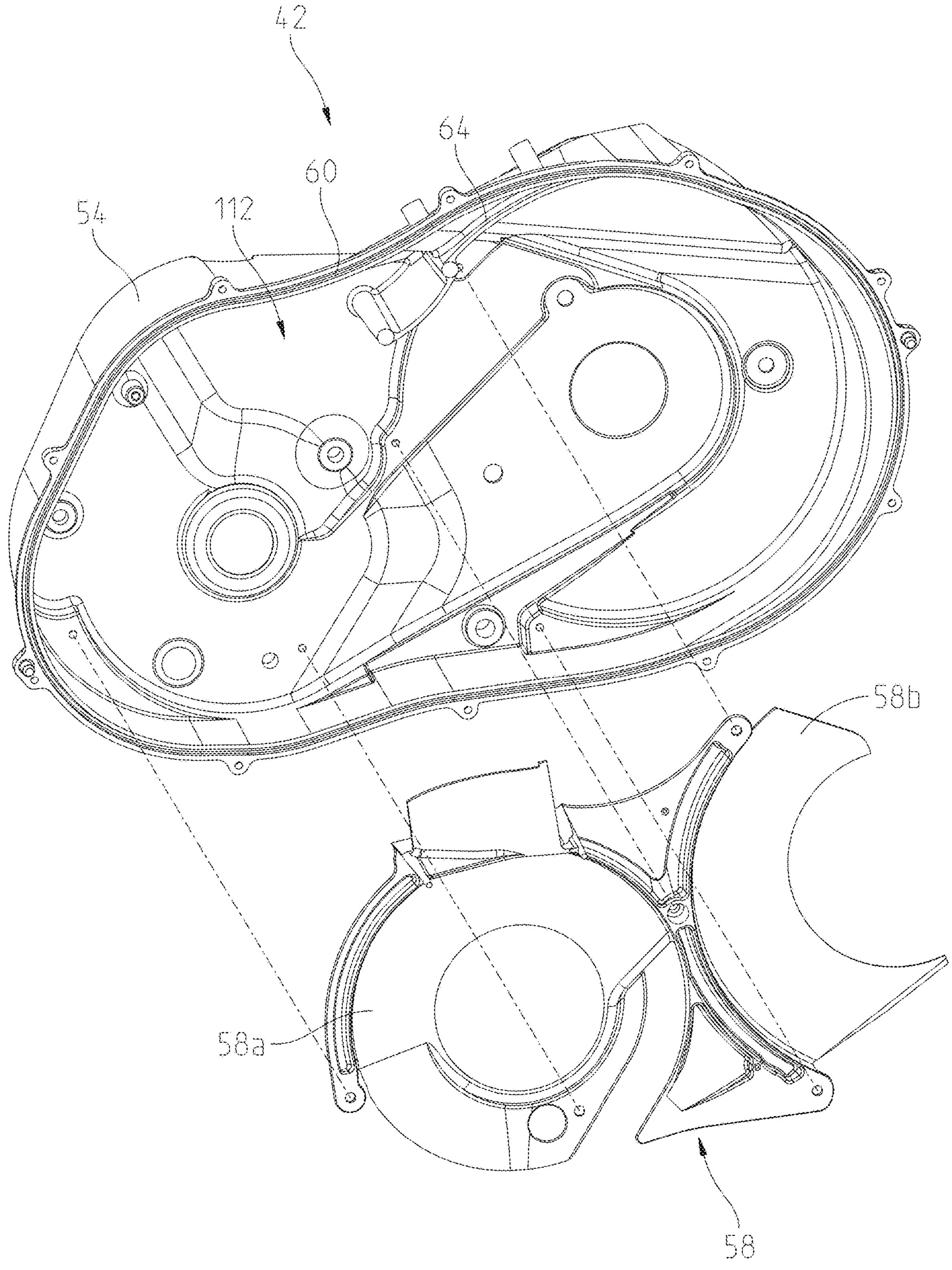
FIG. 8 is an exploded view of an inner cover and an internal diverter plate of a housing of the CVT of FIG. 3A.

With respect to FIGS. 2-10, CVT 34 includes a housing 40 having an inner portion or cover 42 and an outer portion or cover 44 removably coupled together. In one embodiment, inner cover 42 is comprised of a metallic material, such as aluminum, and/or a polymeric material. Inner cover 42 includes a peripheral surface 54 extending outwardly from a rear surface 56. Peripheral surface 54 includes a sealing surface 60, illustratively a lip, configured to couple with outer cover 44 using mechanical fasteners 62. As shown in FIG. 8, inner cover 42 also may include a diverter plate or member 58 configured to direct air flow through housing 40, as disclosed herein. Diverter plate 58 may be removably coupled to inner cover 42 with mechanical fasteners. Diverter plate 58 may include a first portion **58*a* positioned generally adjacent a drive clutch and a second portion 58*b*** positioned generally adjacent a portion of a driven clutch, as disclosed further herein.

Figure 4B:
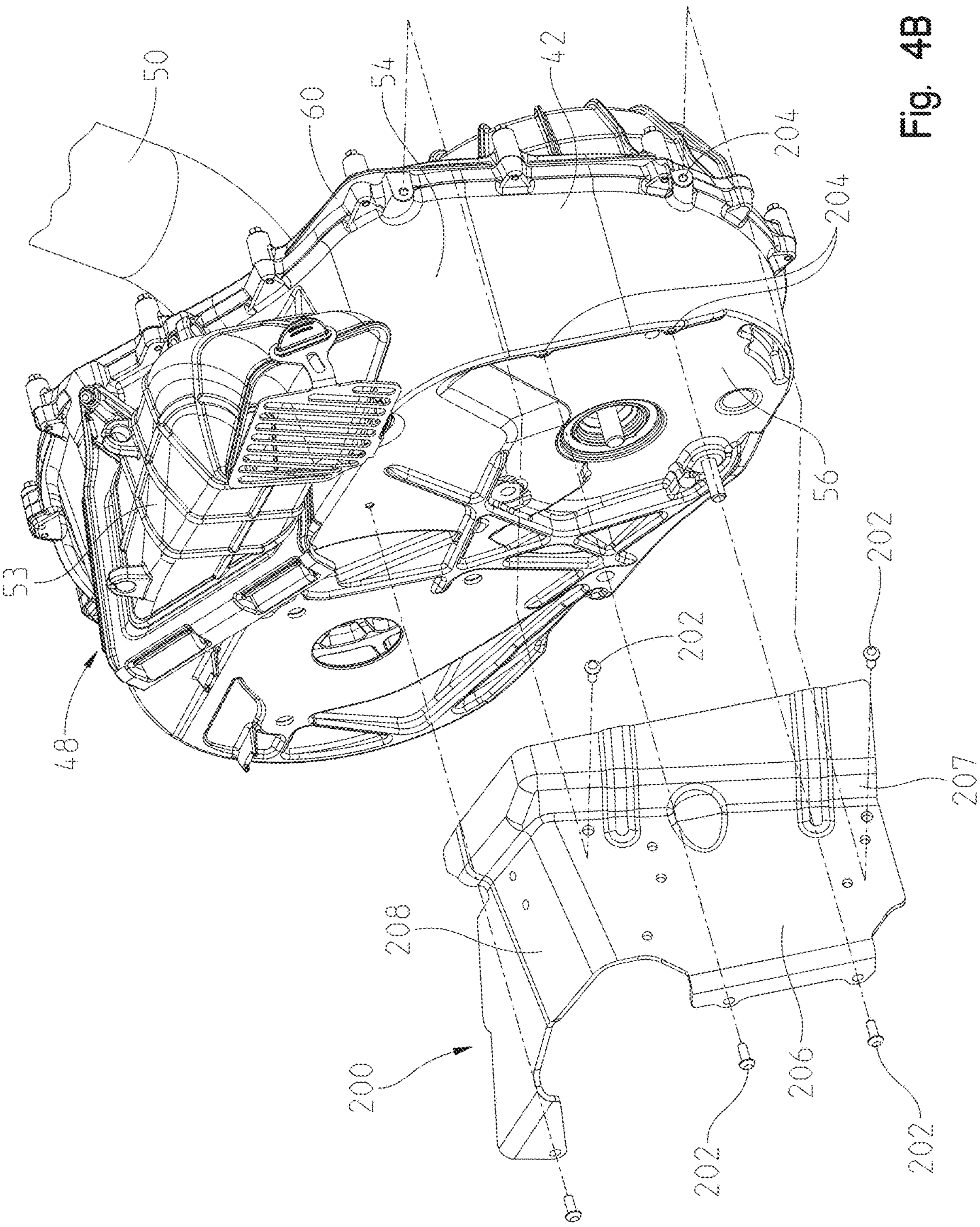
FIG. 4B is a rear perspective view of the CVT of FIG. 3B with a debris shield configured to be coupled to the outer housing of the CVT.

In embodiments, as shown in FIG. 4B, CVT 34 may include a routing tray 200 configured to be coupled to inner cover 42. More particularly, routing tray 200 is coupled to a forward extent of inner cover 42 with a plurality of fasteners 202 which are received within a plurality of apertures 204 on inner cover 42. Routing tray 200 includes a forward portion 206 positioned along the forward surface of inner cover 42 and an upper portion 208 positioned along the upper surface of inner cover 42. In this way, routing tray 200 protects other components of vehicle 2 in the event that a portion of CVT 34 fails. For example, if a component of CVT 34 moves outward of housing 40 during a failure of CVT 34, then routing tray 200 prevents such components from contacting other components and portions of vehicle 2.

Additionally, routing tray 200 includes at least one channel 207 configured to receive a wire, tubing, pipe, or other conduit. In this way, various conduits of vehicle 2 may be routed around a portion of CVT 34 but not contact various portions of housing 40 of CVT 34.

Additionally, outer cover 44 may be comprised of a metallic material and/or a polymeric material, such as an injection-moldable plastic. As shown best in FIG. 7, and disclosed further herein, outer cover 44 generally follows the shape and contour of the drive and driven clutches which may increase air shear and improve heat transfer because the outer surface of outer cover 44 is closely positioned to the sheaves of the drive and driven clutches.

Referring to FIGS. 2-5, CVT housing 40 includes a single air intake or inlet port 46 for receiving air to cool CVT 34 and a single air outlet port 48 to exhaust warm or hot air from CVT 34. Illustratively, outer cover 44 includes air inlet port 46 and inner cover 42 includes air outlet port 48. Inlet port 46 is sealingly coupled to an intake duct 50 to provide cooling, pre-filtered ambient air to CVT 34. As shown in FIG. 3B, intake duct 50 may include a flexible coupler 51 at both ends thereof which allow for coupling and scaling the ends of intake duct 50 to CVT 34 and a CVT intake port 53 of vehicle body 14 (FIG. 14). Intake duct 50 itself is comprised of a rigid material which inhibits duct 50 collapsing, folding, or otherwise deforming. Therefore, intake duct 50 allow the openings at both ends of intake duct 50 to remain fully expanded and allow the maximum amount of air to enter CVT 34. Additionally, outlet port 48 is sealingly coupled to an outlet duct 52 to expel hot air from CVT 34.

Figure 5:
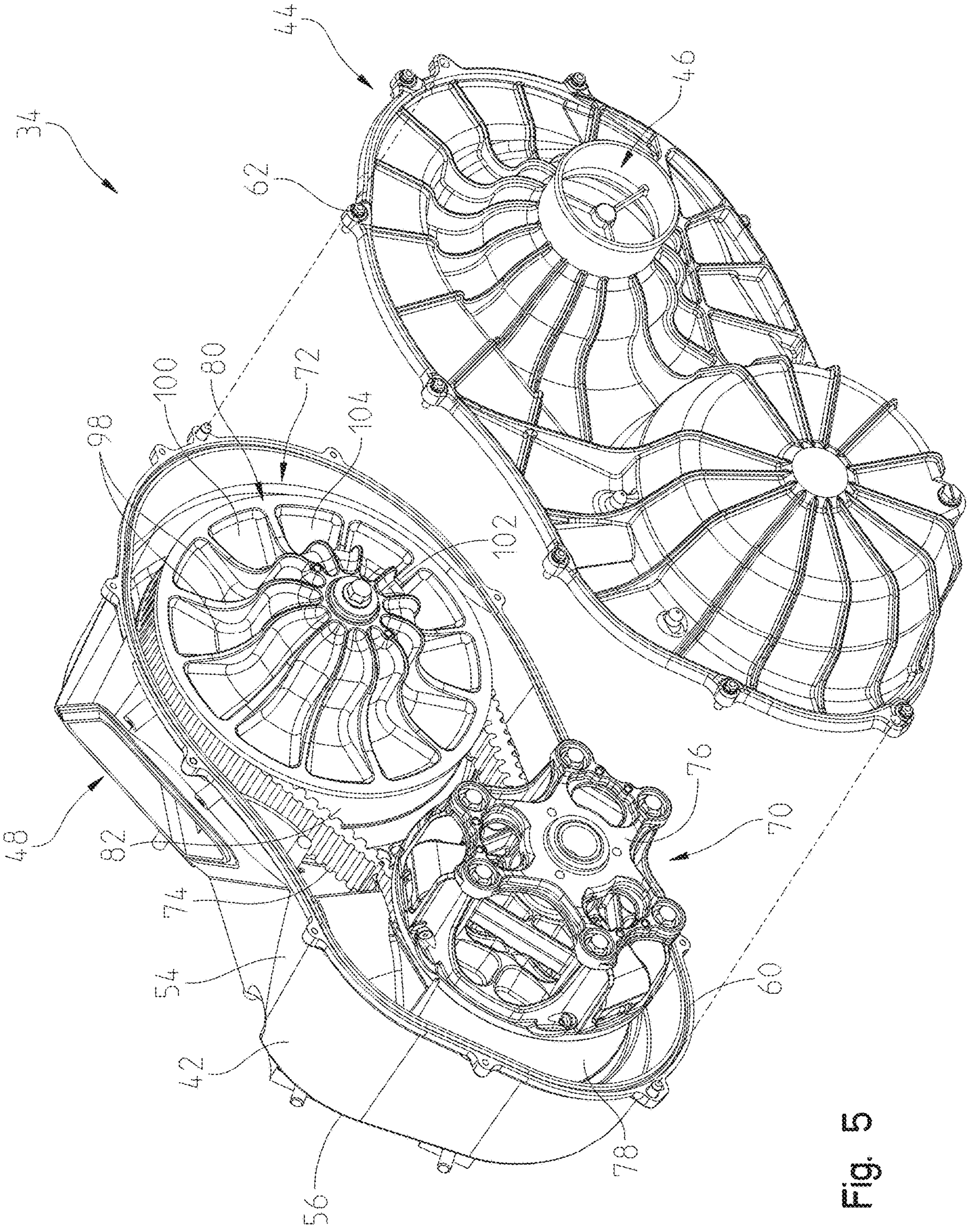
FIG. 5 is an exploded view of the CVT of FIG. 3A.

Referring now to FIGS. 5-7, CVT 34 includes a primary or drive clutch or pulley 70, a secondary or driven clutch or pulley 72, and a belt 74 extending therebetween. Drive clutch 70 is rotatably coupled to a crankshaft (not shown) of engine 32. Driven clutch 72 is rotatably coupled to an input shaft (not shown) of the geartrain and is rotatably coupled to drive clutch 70 through belt 74. Belt 74 may be comprised of a polymeric material, for example rubber, and may also include reinforcing members, such as metal cords or other reinforcing material. In one embodiment, belt 74 may be comprised of a metallic material, for example, belt 74 may be a chain. In cross-section, belt 74 may generally define a "V" shape. Belt 74 is configured to contact drive clutch 70 and, in one embodiment, expand in diameter in order to contact driven clutch 72.

As shown in FIGS. 5-7, drive clutch 70 includes a moveable sheave 76 positioned adjacent outer cover 44 of CVT 34 and a stationary sheave 78 positioned adjacent diverter plate 58 of CVT 34. During operation of CVT 34, stationary sheave 78 maintains a fixed position and does not move relative to moveable sheave 76. Conversely, moveable sheave 76 of drive clutch 70 is configured for axial movement relative to stationary sheave 78 in order to engage belt 74 and effect various drive ratios. The axial movement of moveable sheave 76 occurs generally along an axis of rotation thereof and in a direction perpendicular to longitudinal axis L (FIG. 1). Additional details of drive clutch 70 may be disclosed in U.S. Pat. No. 9,566,858, issued on Feb. 14, 2017 and U.S. patent application Ser. No 15/388,106, filed Dec. 22, 2016, the complete disclosures of which are expressly incorporated by reference herein.

Referring still to FIGS. 5-7, the rotation of belt 74 caused by drive clutch 70 drives driven clutch 72. Driven clutch 72 includes a stationary sheave 80 positioned adjacent outer cover 44 and a moveable sheave 82 positioned adjacent inner cover 42. Stationary sheave 80 is coupled to a shaft of the geartrain and maintains a fixed position relative to moveable sheave 82. Moveable sheave 82 may be configured for axial translational movement along an axis of rotation thereof between a closed position when adjacent stationary sheave 80 and an open position in which moveable sheave 82 slides or otherwise moves axially apart from stationary sheave 80. The movement of moveable sheave 82 engages belt 74 in various configurations in order to effect various driving ratios for vehicle 2. Additional details of driven clutch 72 may be disclosed in U.S. Pat. No. 9,566,858, issued on Feb. 14, 2017 and U.S. patent application Ser. No 15/388,106, filed Dec. 22, 2016, the complete disclosures of which are expressly incorporated by reference herein.

During operation of CVT 34, drive clutch 70 engages belt 74 and when belt 74 engages driven clutch 72, driven clutch 72 rotates, which causes the shaft of the geartrain to rotate. More particularly, drive clutch 70 rotates with the crankshaft of engine 32 and the rotation thereof drives rotation of driven clutch 72 through rotation of belt 74. Depending on the operating conditions of vehicle 2, moveable sheaves 76, 82 of drive clutch 70 and driven clutch 72, respectively, may be moved relative to stationary sheaves 78, 80 to adjust driving ratios for vehicle 2. During movement of moveable sheaves 76, 82, belt 74 is configured to move between a starting position and a high-ratio position. Movement of moveable sheaves 76, 82 may be electronically, mechanically, or fluidly controlled.

With respect to FIGS. 6A-10, as CVT 34 is operating, heat is generated and the temperature within housing 40 increases. As such, it is necessary to cool CVT 34 during operation thereof. In general, CVT 34 is cooled by providing ambient air within housing 40. Housing 40 and any of sheaves 76, 78, 80, 82 may be specifically configured for increased cooling. For example, as disclosed herein, the configuration of outer cover 44 generally follows the contour of sheaves 76, 80 such that air shear and heat transfer are increased due to close positioning of outer cover 44 relative to sheaves 76, 80. Illustratively, a distance 140 is defined between the outermost surface of stationary sheave 80 of driven clutch 72 and an innermost surface of outer cover 44 and distance 140 is equal at all portions of outer cover 44 adjacent stationary sheave 80 of driven clutch 72. In one embodiment, distance 140 may be approximately 4-10 mm and, illustratively, is approximately 6 mm. Distance 140 may be optimized to be the smallest distance between the outermost surface of stationary sheave 80 of driven clutch 72 and the innermost surface of outer cover 44 without allowing for any interference therebetween, thereby facilitating air flow through housing 40 and around stationary sheave 80.

As shown in FIG. 6A, with respect to the configuration of sheaves 76, 78, 80, 82, at least some of sheaves 76, 78, 80, 82 have an increased surface area due to the inclusion of fins. Illustratively, at least stationary sheave 78 of drive clutch 70 includes a plurality of fins 84 extending radially outward from an axis of rotation $R_1$ of drive clutch 70. More particularly, fins 84 extend outward from a body portion or outer sheave face 86 of sheave 78 in the direction of axis of rotation $R_1$ and extend radially therefrom. A first portion 88 of fins 84 has a length less than a length of a second portion 90 of fins 84. As shown in FIG. 6B, first portion 88 of fins 84 extends radially outwardly from a lip 87 of outer sheave face 86 along a distance $D_1$, which is measured from lip 87 to an apex 88A defining the radially-outermost surface of fins 88. Similarly, as shown in FIG. 6C, second portion 90 of fins 84 extends radially outwardly from lip 87 of outer sheave face 86 along a distance $D_2$, which is measured from lip 87 to an apex 90A defining the radially-outermost surface of fins 90. Distances $D_1$ and $D_2$ may be approximately equal to each other or may be different such that distance $D_1$ may be greater or less than distance $D_2$. In one embodiment, $D_1$ and $D_2$ are 3-6 mm and, more particularly, are approximately 4-5 mm. Illustratively, both $D_1$ and $D_2$ may be approximately 4.9 mm. It may be appreciated that distances $D_1$ and $D_2$ do not extend radially outwardly to a position which would interfere with or contact inner cover 42 of housing 40.

In one embodiment, first portion 88 includes 18 fins 84 and second portion 90 includes 18 fins 84. As such, stationary sheave 78 of drive clutch 70 may include a total of 36 fins 84. However, in other embodiments, first and second portions 88, 90 may include different and/or unequal numbers of fins 84 and stationary sheave 78 may include a total number of fins 84 less than or greater than 36. In one embodiment, an angular distance between fins 84 may be approximately equal to or less than 15 degrees and, other embodiments, the angular distance between fins 84 may be approximately 6-10 degrees if the number of fins 84 is increased. By including fins 84 on stationary sheave 78, the surface area of sheave 78 is increased. In this way, the surface of sheave 78 which may be exposed to ambient air entering housing 40 is increased, thereby allowing for increased efficiencies when cooling stationary sheave 78 and when removing heat from belt 74.

Referring still to FIG. 6A, moveable sheave 82 of driven clutch 72 also may include a plurality of fins 92 extending radially outward in a direction perpendicular to an axis of rotation $R_2$ of driven clutch 72 and extending laterally outward from a body portion or outer sheave face 94 in the direction of axis of rotation $R_2$. It may be appreciated that at least a portion of fins 92 extends laterally outward of a balance ring 83 defining the outer diameter of moveable sheave 82 such that at least a portion of fins 92 are proud of balance ring 83, as shown in at least FIG. 15. Illustrative moveable sheave 82 may include a total of 12 fins 92, however, moveable sheave 82 may include any number of fins 92. Fins 92 may be coupled together with a circumferentially-extending fin 96. The combination of radially-extending fins 92 and circumferentially-extending fin 96 increases the surface area of moveable sheave 82, thereby allowing for increased cooling thereof when ambient air enters housing 40 and removal of heat from belt 74.

As shown best in FIG. 5, stationary sheave 80 of driven clutch 72 also includes a plurality of fins 98 extending radially outward in a direction generally perpendicular to axis of rotation $R_2$ (FIG. 6A) of driven clutch 72 and extending laterally outward from a body portion or outer sheave face 100 in the direction of axis of rotation $R_2$. Illustrative stationary sheave 80 may include a total of 12 fins 98, however, stationary sheave 80 may include any number of fins 98. Each of fins 98 may extend continuously between a nose or bell portion 102 and a planar portion 104 of outer sheave face 100. Fins 98 increases the surface area of stationary sheave 80, thereby allowing for increased cooling thereof when ambient air enters housing 40 and removal of heat from belt 74.

In addition to the increased surface area of at least sheaves 78, 80, 82 through respective fins 84, 92, 98, the configuration of housing 40 increases cooling efficiencies of CVT 34. More particularly, and referring to FIGS. 7-10, outer cover 44 receives ambient air through intake duct 50 and inlet port 46. Outer cover 44 includes a first channel 110 which directs air A toward a center portion of stationary sheave 80 of driven clutch 72. More particularly, first channel 110 is defined as the area between fins 98 through which air A is propelled away from the center of stationary sheave 80 such that fins 98 may fill with air A in first channel 110 and evacuate air A about driven clutch 72 in a radial direction once fins 98 rotate past air inlet port 46. Illustratively, as air A enters first channel 110 adjacent the center of stationary sheave 80, air A flows radially outward through first channel 110 and towards an upper portion of housing 40, as disclosed further herein. In this way, air A is configured to flow through first channel 110 to cool at least stationary sheave 80 of driven clutch 72. Air A then flows into a second channel 112 defined between a surface 142 of outer cover 44 and inner cover 42 and between diverter plate 58 and inner cover 42. Additionally, driven clutch 72 may have a larger diameter than drive clutch 70 such that driven clutch 72 may be able to pump or otherwise drive or direct air A through housing 40 and towards drive clutch 70 for increased cooling at drive clutch 70.

Figure 9:
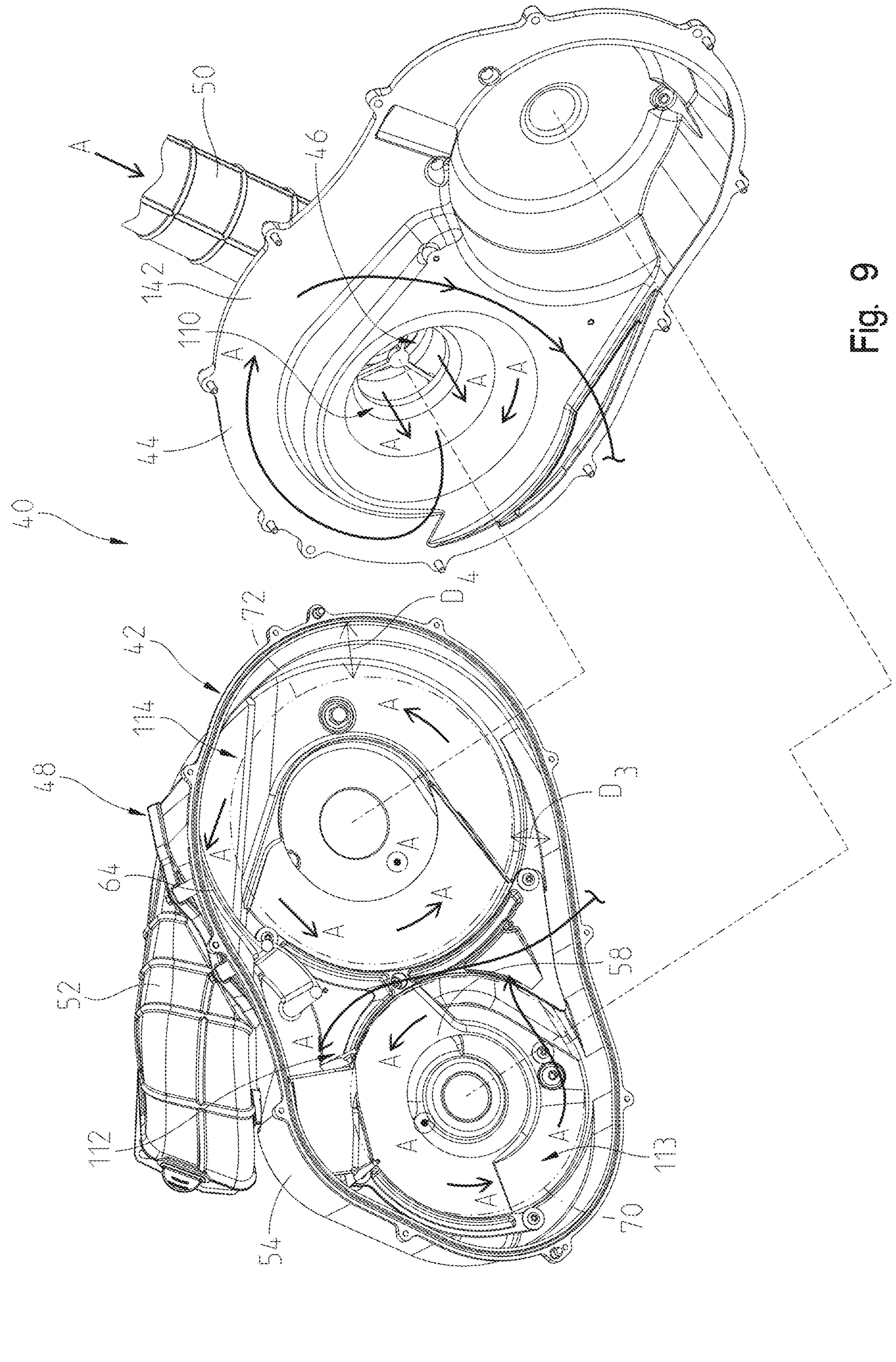
FIG. 9 is an exploded view of the inner cover and an outer cover of the housing of the CVT of FIG. 3A and including an illustrative air flow path through the housing.
Figure 10:
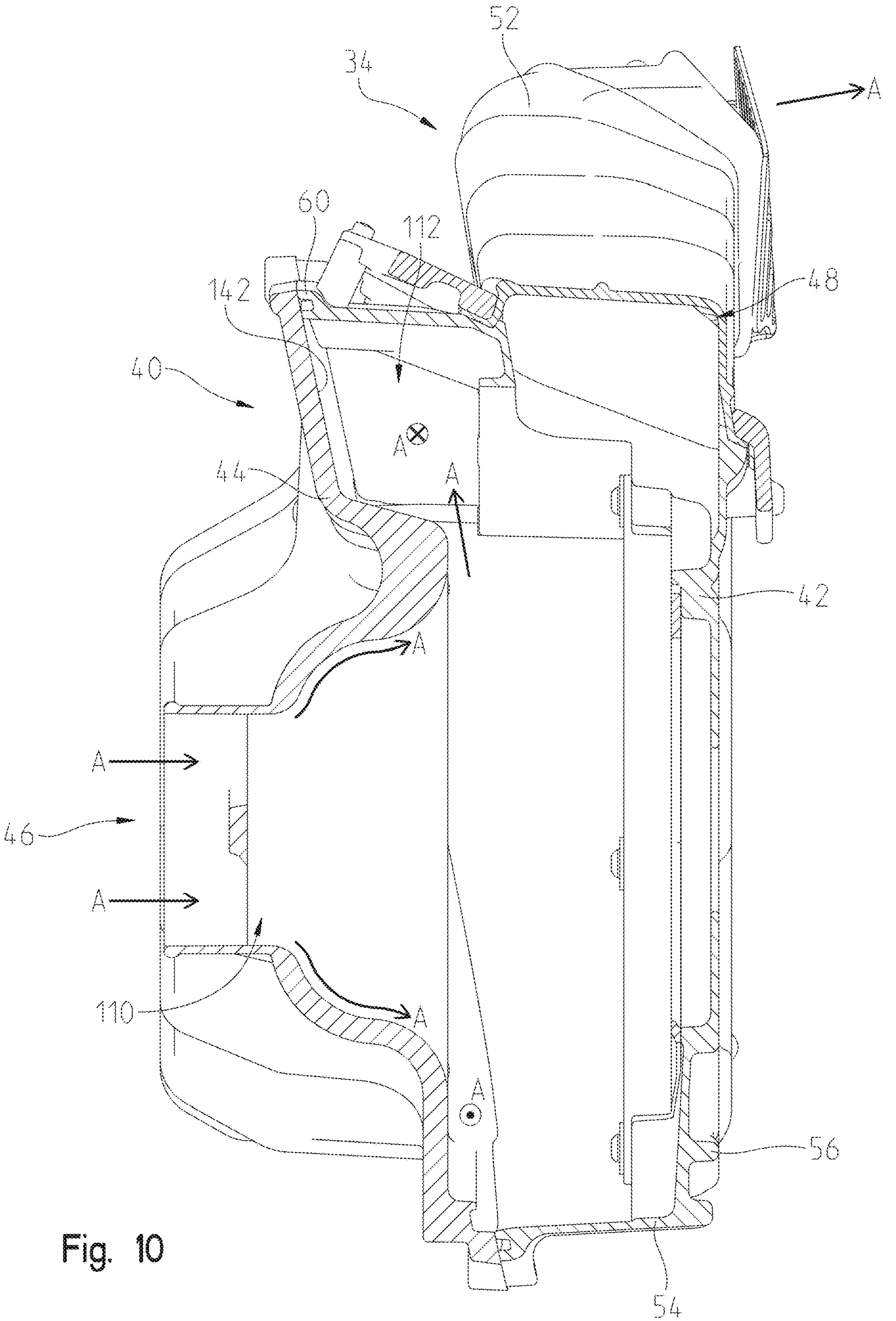
FIG. 10 is a cross-sectional view of the CVT of FIG. 3A, taken along line 10-10 of FIG. 3A.

As shown in FIGS. 8-10, second channel 112 is positioned generally adjacent a portion of drive clutch 70 and, illustratively, is positioned generally adjacent stationary sheave 78 thereof. As shown in FIG. 10, air A flows in an inward direction normal to the page, as indicated by the circled "X", when flowing through second channel 112 towards drive clutch 70. It may be appreciated that inner cover 42 includes an extension member 64, as shown in FIGS. 8 and 9, which prevents incoming air A at a position adjacent outlet port 48 from flowing directly out of housing 40 through outlet port 48. Rather, extension member 64 directs incoming air A towards second channel 112. Second channel 112 promotes air flow from driven clutch 72 and towards drive clutch 70 by drawing air A from first channel 110 towards drive clutch 70 and directing air A radially thereto. In this way, housing 40 is configured to allow air to flow between inner and outer covers 42, 44 and between drive clutch 70 and driven clutch 72.

Air A then flows in a generally counterclockwise direction about stationary sheave 78 and is distributed about a center portion thereof to provide cooling air thereto, as indicated by the circled "dot" in FIG. 9, denoting air A flowing outwardly in a direction normal to the page and towards the location of moveable sheave 76. Air A then flows toward driven clutch 72 through a third channel 113 defined by diverter plate 58 such that air flow occurs between clutches 70, 72 and between inner and outer covers 42, 44. In this way, air A flowing into second channel 112 is distributed about stationary sheave 78 of drive clutch 70 and then flows into third channel 113 which facilitates air flow towards driven clutch 72.

Air A at driven clutch 72 also may flow in a generally counterclockwise direction and, in some embodiments, may join with air A initially entering housing 40 through channel 110. Additionally, air A may flow outwardly towards moveable sheave 82 of driven clutch 72, as indicated by the circled "dot" to join with other flow streams or paths of air A. When air A at driven clutch 72 circulates about stationary and moveable sheaves 80, 82 of driven clutch 72 and flows towards an upper portion of inner cover 42, air A may exit housing 40 at portion or channel 114 and flow outwardly from housing 40 through outlet port 48 and outlet duct 52.

To promote air A to flow counterclockwise about driven clutch 72, peripheral surface 54 of inner cover 42 is configured to increase in distance from driven clutch 72 in the direction of the flow of air A. More particularly, where air A flows from third channel 113 towards driven clutch 72, a distance $D_3$ between the radially-outermost surface of driven clutch 72 and the inner portion of peripheral surface 54 is less than a distance $D_4$, defined as the distance between the radially-outermost surface of driven clutch 72 and the inner portion of peripheral surface 54 generally adjacent outlet port 48. By configuring peripheral surface 54 of inner cover 42 to increase in distance from driven clutch 72 in the counterclockwise direction, air A is guided or encouraged to flow in the counterclockwise direction to cool the entirety of driven clutch 72 and any hot air generally surrounding driven clutch 72 is guided toward outlet port 48 to be expelled from housing 40. Therefore, the configuration of housing 40 and, in particular, inner cover 42, promotes air flow about driven clutch 72 and guides hot air towards outlet port 48, thereby increasing cooling efficiency for CVT 34.

Referring to FIGS. 11A-20, vehicle 2 (FIG. 1) may include a powertrain assembly 30' having an engine 32' and a CVT 34. CVT 34' may be positioned laterally outward of engine 32' and operably coupled to engine 32' and a shiftable transmission 35 through a bell housing 160. Alternatively, CVT 34' may be positioned longitudinally forward of engine 32' and extend laterally across a width of vehicle 2. In such a configuration, the drive clutch of CVT 34' is positioned generally along a front passenger or right side of vehicle 2 and the driven clutch of CVT 34' is positioned generally along a driver or left side of vehicle 2. In one embodiment, the driven and drive clutches may be positioned on opposing sides of longitudinal axis L. However, in other embodiments where the majority or an entirety of CVT 34' is positioned along one side of longitudinal axis L, the driven and the drive clutches may be positioned on the same side of longitudinal axis L.

Figure 11A:
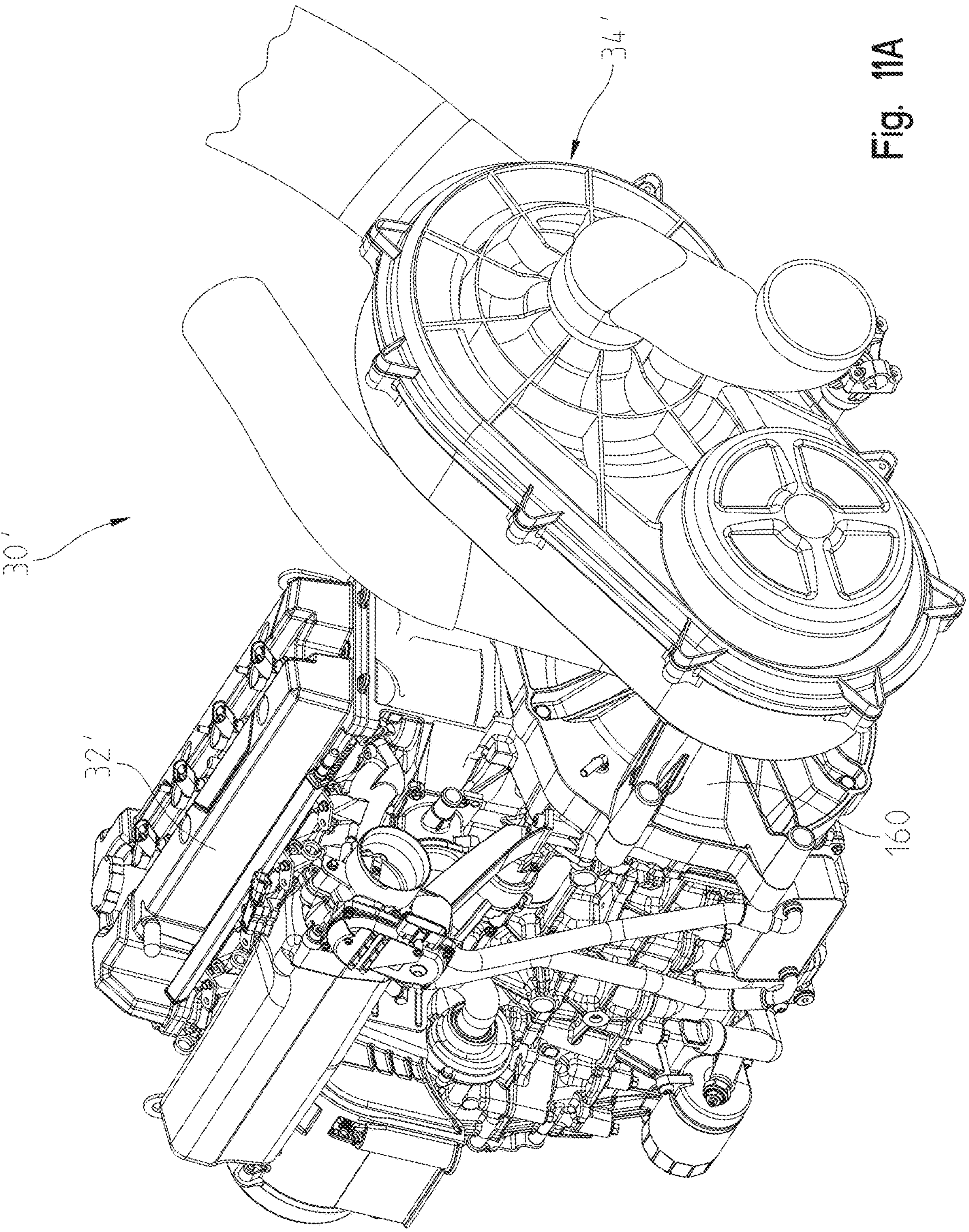
FIG. 11A is a front perspective view of a further powertrain assembly of the vehicle of FIG. 1.
Figure 11B:
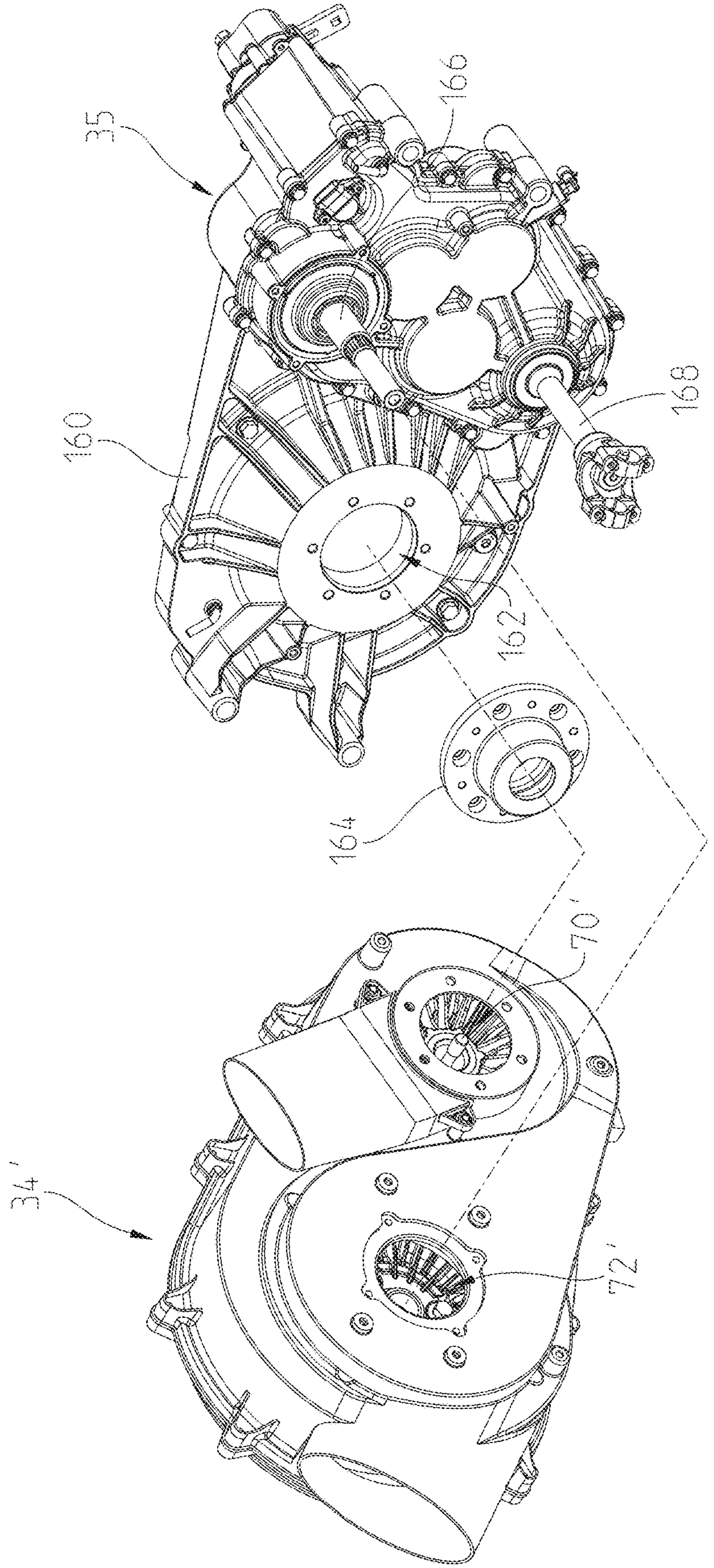
FIG. 11B is an exploded view of a CVT and bearing housing of the powertrain assembly of FIG. 11A.
Figure 11C:
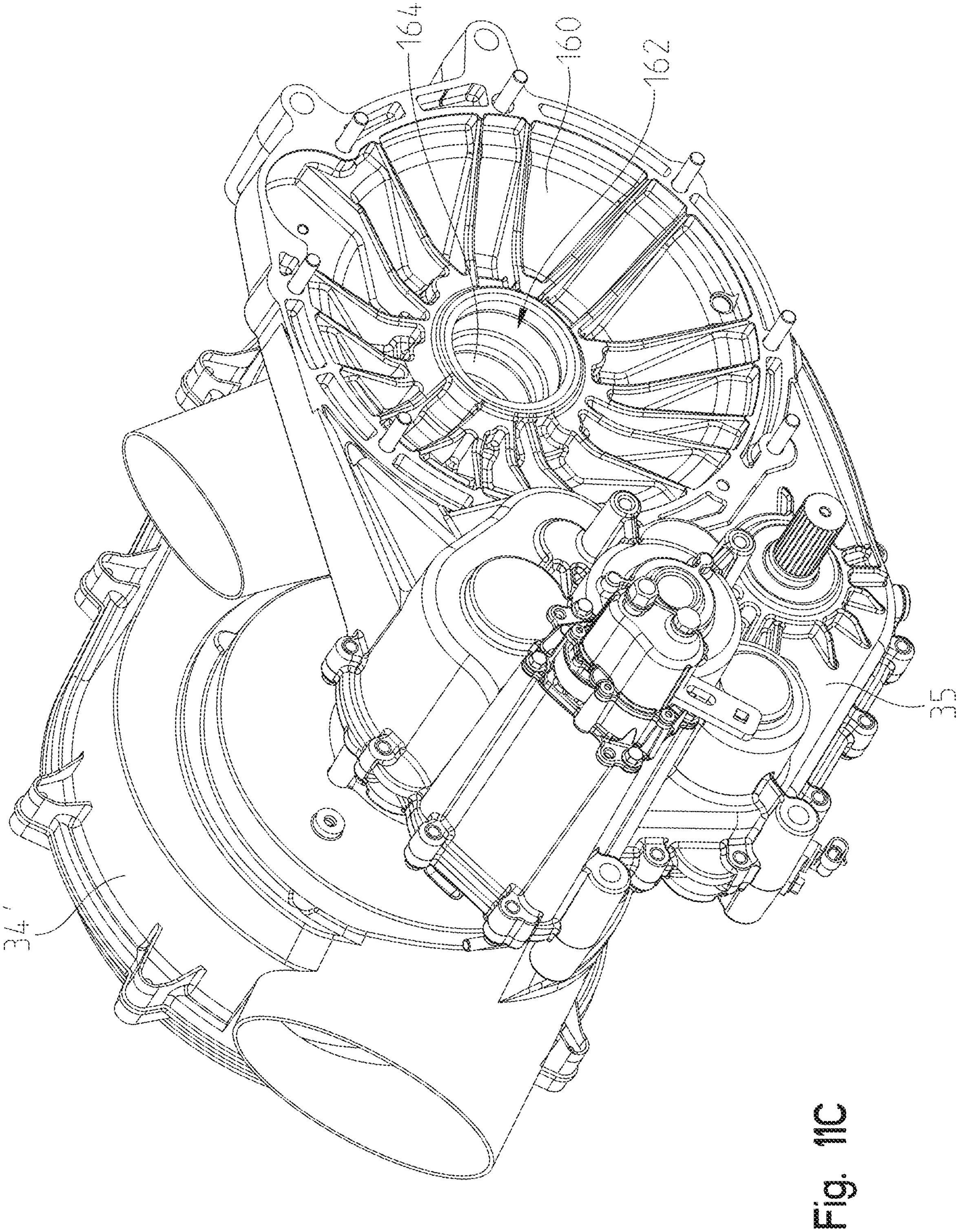
FIG. 11C is a rear perspective view of the CVT and bearing housing of FIG. 11B.

As shown best in FIGS. 11A-11C, a bell housing 160 is integral with transmission 35 and includes an opening 162 configured to allow coupling between the crankshaft (not shown) of engine 32' and a drive clutch 70 of CVT 34'. More particularly, a carrier bearing 164 is positioned intermediate bell housing 160 and the drive clutch and facilitates appropriate coupling, alignment, and spacing between engine 32' and CVT 34'. Bell housing 160 may be utilized where, due to the configuration of engine 32' and/or transmission 35, CVT 34' is spaced from engine 32' by more than a predetermined distance. As such, bell housing 160 is configured to support CVT 34' at a location greater than the predetermined distance from engine 32' and provide the necessary space for a drive inlet or other component of powertrain assembly 30'. Additionally, the space between engine 32' and CVT 34' which is created by bell housing 160 allows for air flow along an inner side of CVT 34' such that air can flow adjacent a drive clutch of CVT 34', as disclosed further herein, to facilitate cooling of the drive clutch.

Figure 11D:
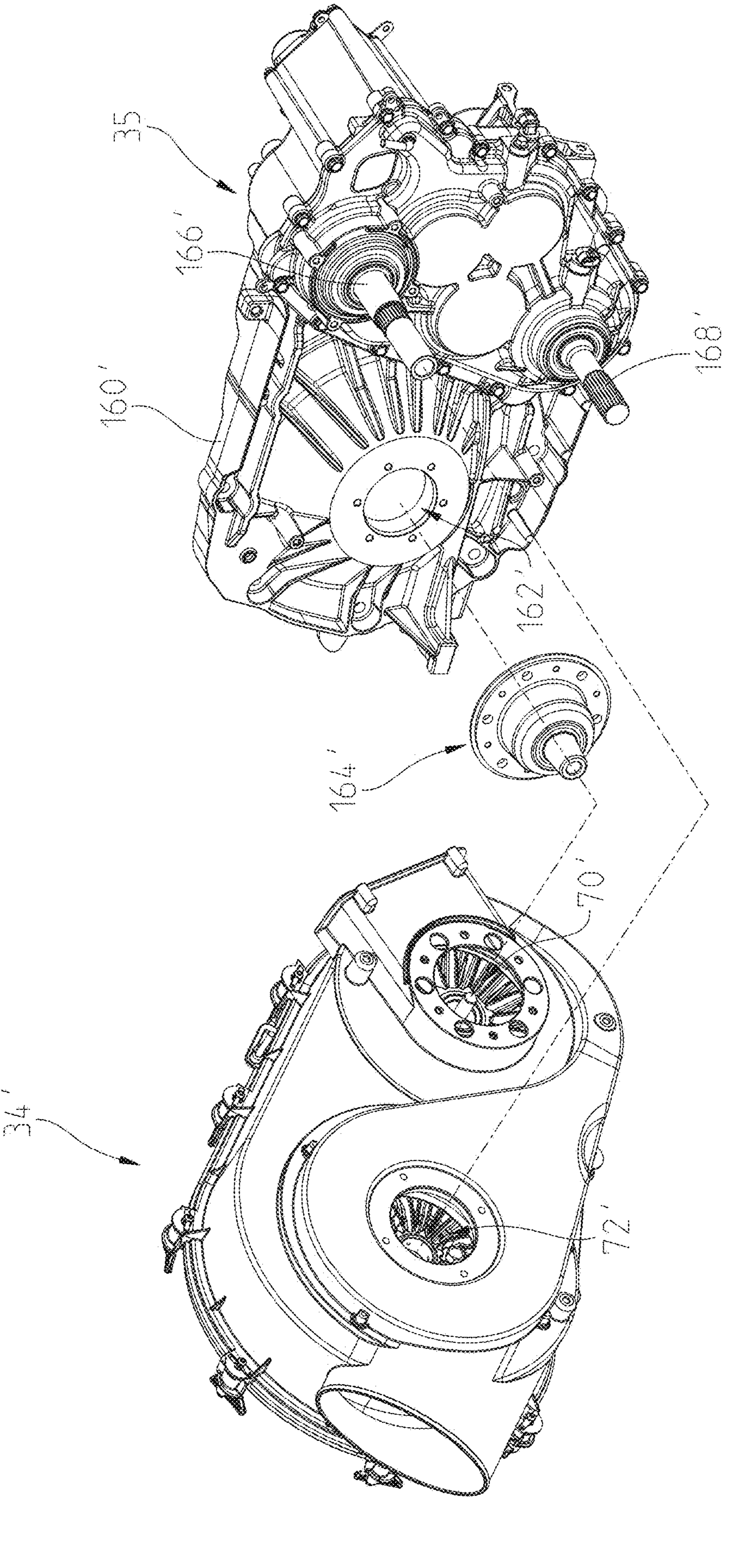
FIG. 11D is a rear perspective view of the CVT housing and an alternative bearing housing.
Figure 11E:
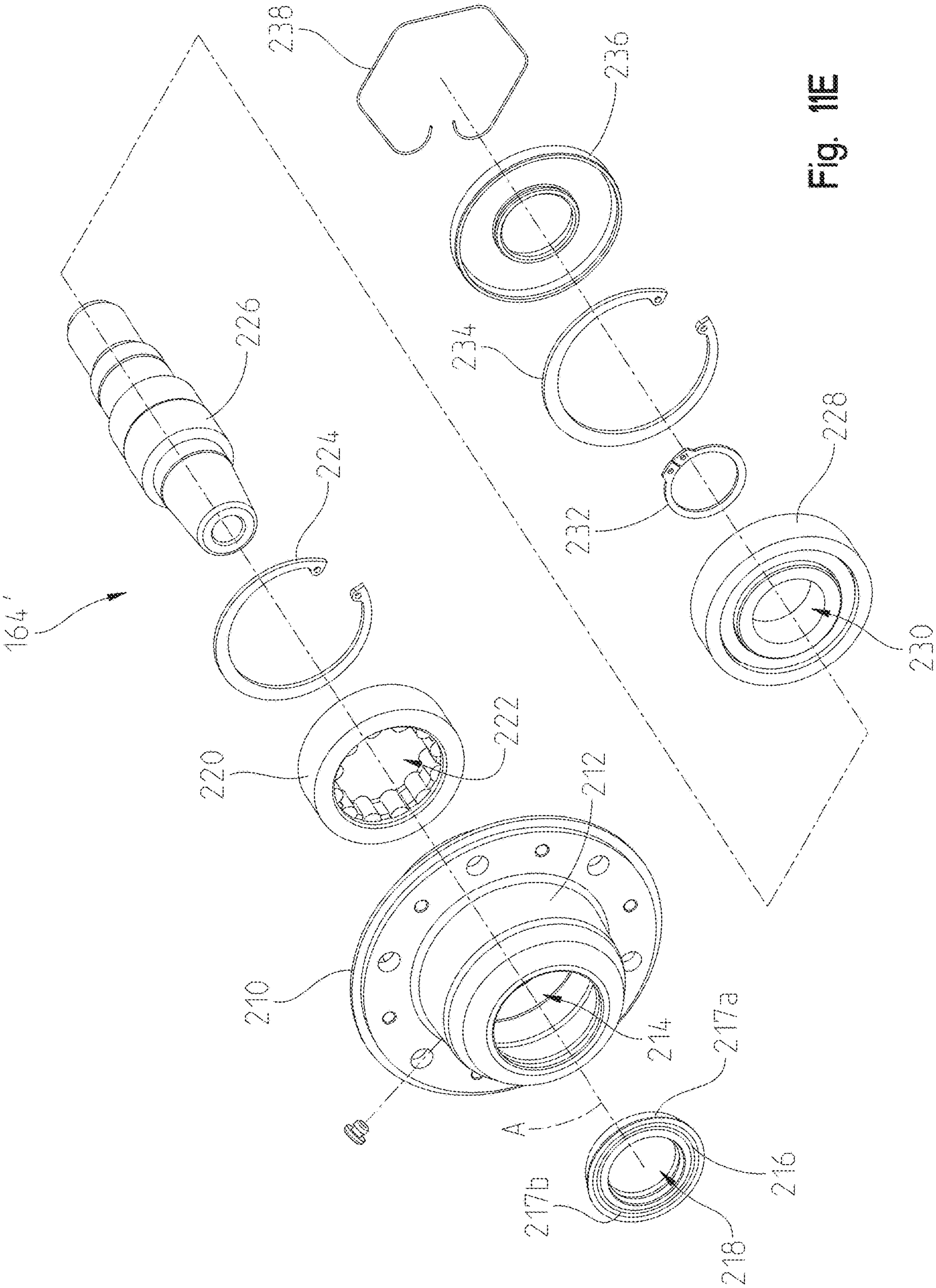
FIG. 11E is an exploded view of a carrier bearing assembly of the bearing housing of FIG. 11D.

As disclosed herein, bell housing 160 is integral with transmission 35 such that bell housing 160 is integrally formed with a housing of transmission 35. Transmission 35 is configured to be operably coupled with the driven clutch of CVT 34' through an input shaft 166 of transmission 35. In this way, rotational movement of the driven clutch is transferred to transmission 35 through input shaft 166. Transmission 35 includes an internal gear set (not shown) which transfers movement to an output shaft 168 configured to be operably coupled to a rear drive member (not shown) for providing motive power to rear wheels 8. Referring to FIGS. 11D and 11E, in embodiments, an alternative bell housing 160' is integral with transmission 35 which is coupled to driven clutch 72' of CVT 34' through input shaft 166' and is coupled to the rear drive member through output shaft 168'. Transmission 35 also is coupled to drive clutch 70' of CVT 34' through bell housing 160'. More particularly, a carrier bearing assembly 164' is partially received within an opening 162' of bell housing 160' and is coupled with drive clutch 70'.

Carrier bearing assembly 164', as shown in FIG. 11E, includes a bearing housing 210 having a nose 212 and a central aperture 214. A lip seal 216 is received within nose 212 and includes a central aperture 218 which is coaxial with central aperture 214. Carrier bearing assembly 164' includes a rolling element bearing 220 also with a central aperture 222 coaxial with apertures 214, 218. A retention member 224, such as a "C" clip, is positioned within nose 212 and proximate rolling element bearing 220 therein. Central apertures 214, 218, 222 are configured to receive a portion of an axial shaft 226 which is configured to rotate about an axis A to transmit rotational force between transmission 35 and drive clutch 70'. Shaft 226 is received within a central aperture 230 of a bearing 228, illustratively a roller bearing. Bearing 228 is retained on shaft 226 with retention member 224 and a plurality of other retention members, such as retention member 232 and retention member 234. In embodiments, both retention members 232, 234 are spring members and retention member 234 is a C clip. Additionally, a plate 236 may abut bearing 228 and further retain bearing 228 and retention members 232, 234. A spring member 238 may be positioned proximate plate 236 and abut a portion of bearing housing 210.

It may be appreciated that portions of carrier bearing assembly 164' are positioned within the inlet of drive clutch 70'. For example, at least nose 212 of bearing housing 210, rolling element bearing 220, and portions of axial shaft 226 are received within the inlet of drive clutch 70' such that carrier bearing assembly 164' positions bell housing 160' and transmission 35 as close to CVT 34' as possible. More particularly, at least portions of carrier bearing assembly 164' are positioned within housing 40' of CVT 34', thereby allowing CVT 34' to be packaged in close proximity to transmission 35 given that this area of vehicle 2 tends to be crowded with additional components.

Figure 11F:
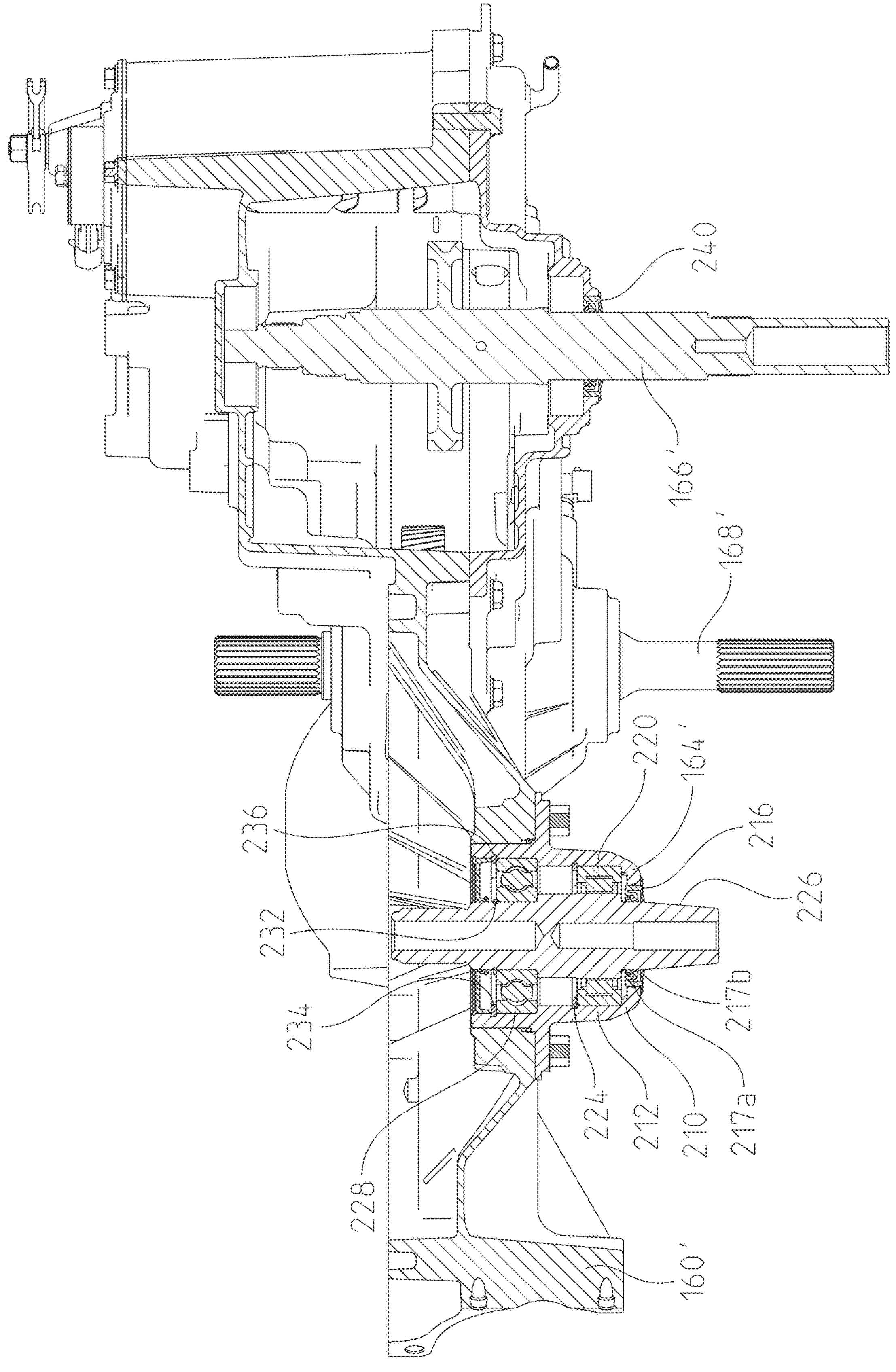
FIG. 11F is a cross-sectional view of the transmission and carrier bearing assembly of FIG. 11D.
Figure 11G:
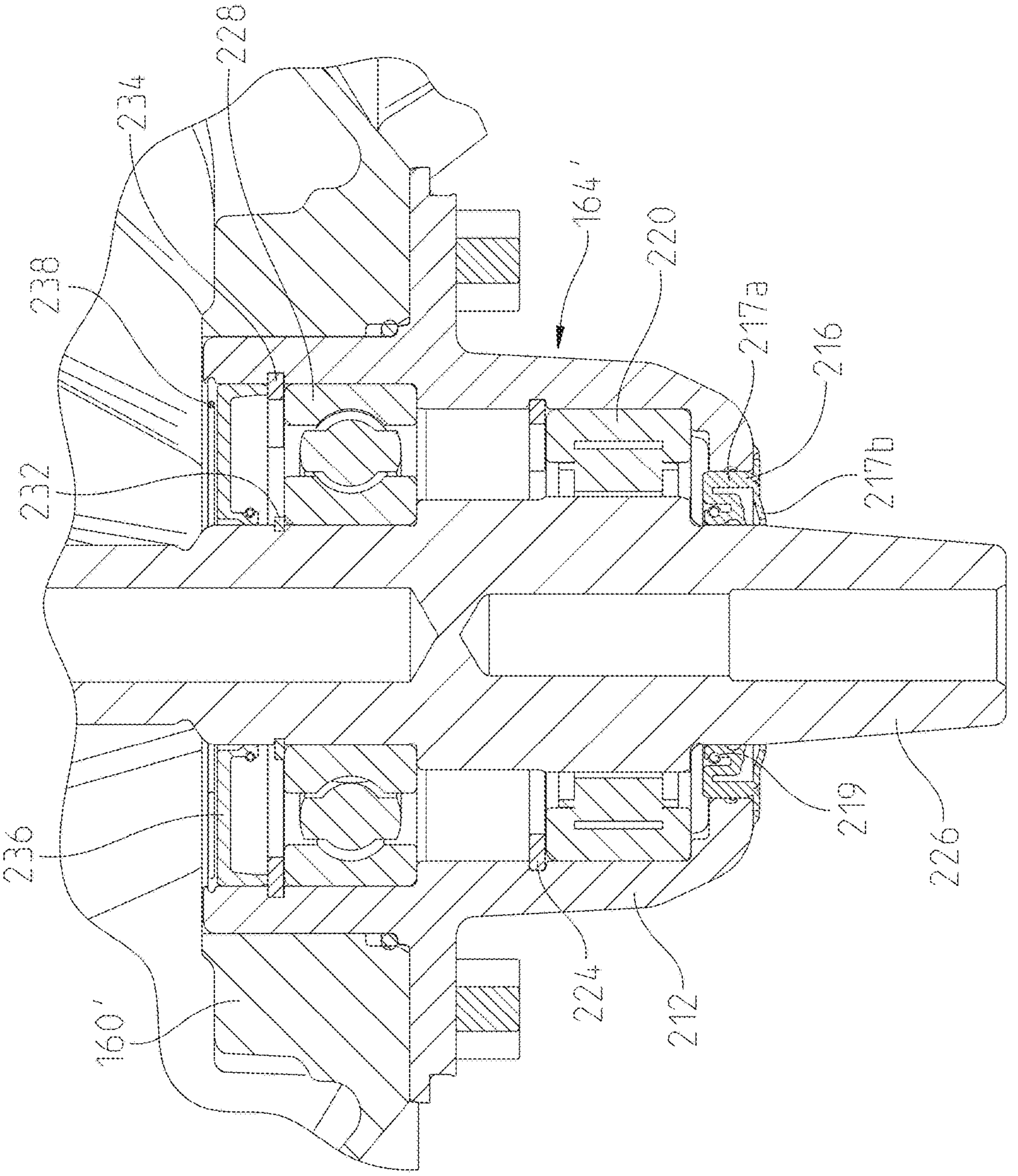
FIG. 11G is a detailed cross-sectional view of the carrier bearing assembly of FIG. 11F.

Because carrier bearing assembly 164' positions CVT 34' in close proximity to bell housing 160' and transmission 35, seal 216 is configured to prevent oil transfer to/from CVT 34'. More particularly, seal 216 includes a body portion 217*a* and a flange or wiper 217*b* coupled to body portion 217*a* and positioned at an axial end of body portion 217*a*. At least wiper 217*b* is comprised of a rigid material, for example a metallic material. Body portion 217*a* has a serpentine configuration and is positioned with central aperture 214 of nose 212 of bearing housing 210 while wiper 217*b* is a generally linear member and is positioned axially outward of nose 212 such that wiper 217*b* is in sealing contact with shaft 226 and the axial end of nose 212. Body portion 217*a* also includes at least one spring 219, illustratively comprised of a rigid material such as metal, as shown best in FIG. 11G, which is configured to apply pressure to the sealing lip of seal 216. More particularly, spring 219 maintains near constant and sufficient compression of the lip seal interface of seal 216 to ensure proper sealing as seal 216 and the shaft wears due to relative rotational motion over the life of the assembly. It may be appreciated that a seal 240, having the same configuration as seal 216, may be positioned at the interface of input shaft 166' and bell housing 160', as shown in FIG. 11F.

Wiper 217*b* of seal 216 (which is the same configuration for seal 240) is configured to prevent debris contact the sealing lip(s) of seal 216. For example, in the event of a failure of belt 74', cord and debris may become entangled around shafts 166' and/or 226 between sheave 84' and/or sheave 94' and adjacent seal 216, 240. During subsequent operation, relative motion between belt cord material and seal(s) 216, 240 generate enough heat and abrasion to potentially damage seal 216, 240. The continued operation of sheaves 84', 94' create a vacuum which then could allow oil transfer between CVT 34' and transmission 35. However, the position and configuration wiper 217*b* relative to nose 212 and shaft 226 prevents seal 216 from contacting cord and debris from failed belt 74' even if belt 74' applies a pressure thereto.

During operation of transmission 35 and CVT 34', as belt 74' and moveable sheave 76' of drive clutch 70' move relative to each other, belt 74' may exert a force on stationary sheave 78'. This force could be transmitted to seal 216 and potentially push seal 216 such that seal 216 moves out of position and creates a vacuum which allows oil transfer between CVT 34' and transmission 35. However, the position and configuration of wiper 217*b* relative to nose 212 and shaft 226 prevents seal 216 from moving even if belt 74' applies a pressure thereto. As such, wiper 217*b* maintains the position of seal 216 on shaft 226. More particularly, because wiper 217*b* is positioned outwardly of nose 212 and bearing housing 210 extends into housing 40' of CVT 34', wiper 217*b* is exposed to the inside of housing 40' and cannot be pushed into bearing housing 210 even if belt 74' applies a pressure thereto.

Additionally, the diameter of nose 212 of carrier bearing assembly 164' is minimized by selecting a non-spherical rolling element bearing 220 to provide an annular space for cooling air to enter through inlet port 46*a* to get to the center of stationary sheave 78' of drive clutch 70'. In this way, the configuration of carrier bearing assembly 164' allows for increased cooling air to facilitate cooling of at least drive clutch 70' while also maintaining close proximity of CVT 34' to transmission 35.

Figure 13:
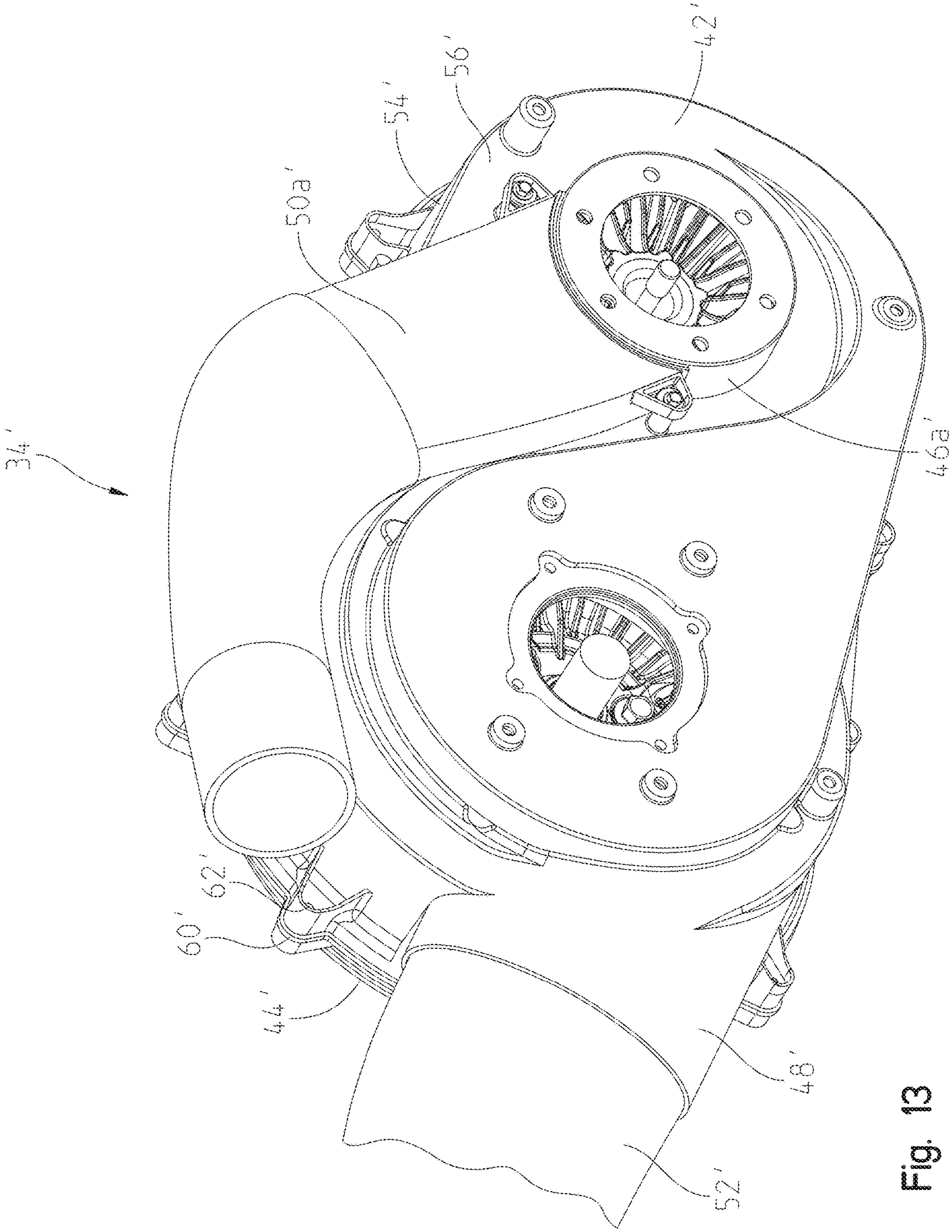
FIG. 13 is a rear perspective view of the CVT of FIG. 12.
Figure 17:
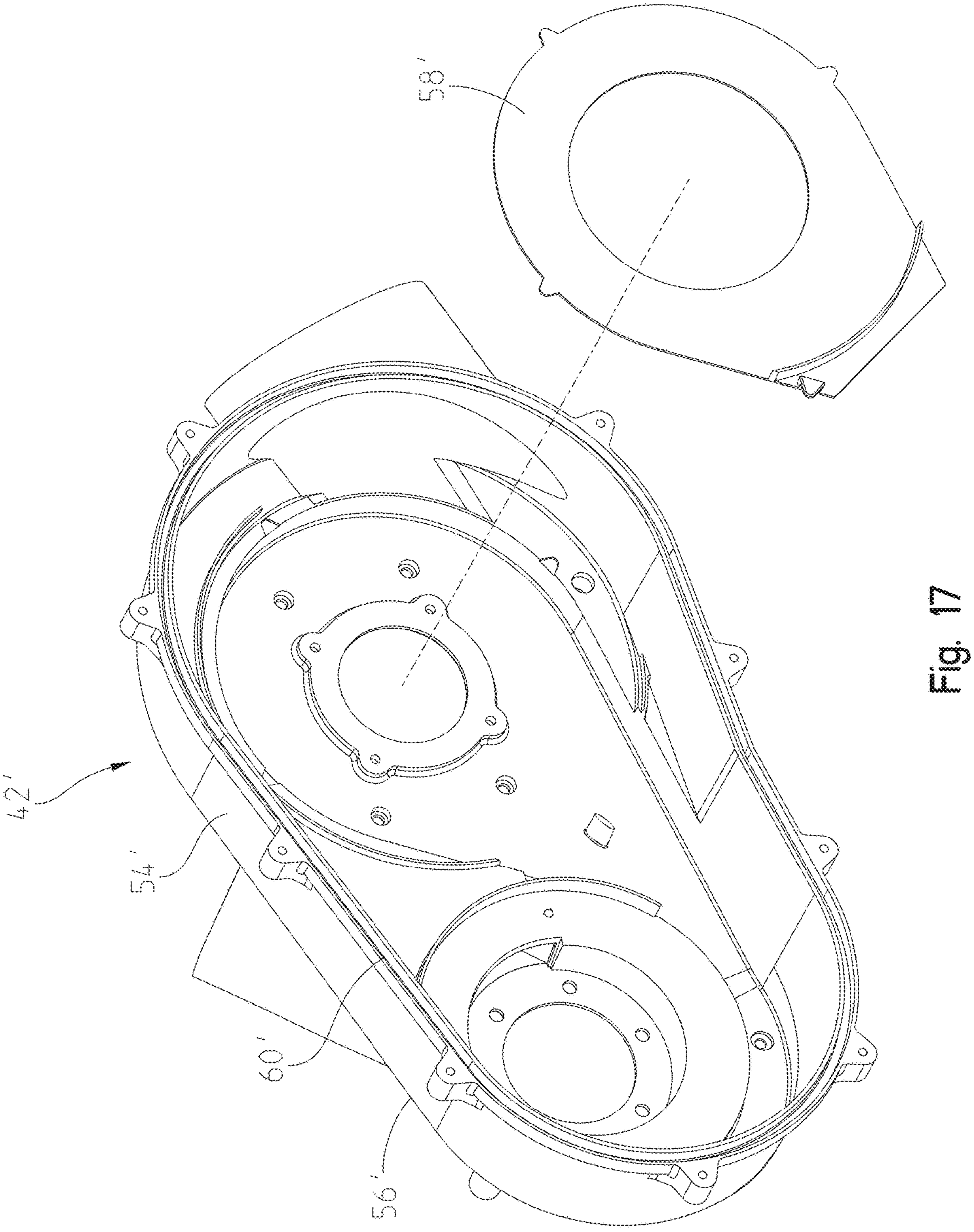
FIG. 17 is an exploded view of an inner cover and an internal diverter plate of a housing of the CVT of FIG. 12.

Referring now to FIGS. 12-14B, CVT 34' includes a housing 40' having an inner cover 42' and an outer cover 44' which are removably coupled together with mechanical fasteners. Housing 40' may be configured as shown in FIG. 14A or as in FIG. 14B. In one embodiment, inner cover 42' is comprised of a metallic material, such as aluminum, and/or a polymeric material. Inner cover 42' includes a peripheral surface 54' extending from a rear surface 56'. Peripheral surface 54' includes a sealing surface 60', illustratively a lip, configured to couple with outer cover 44' using mechanical fasteners 62' (FIG. 13). As shown in FIG. 17, inner cover 42' also may include a diverter plate or member 58' configured to direct air flow through housing 40'. Diverter plate 58' may be removably coupled to inner cover 42' with mechanical fasteners. Diverter plate 58' is generally positioned adjacent the drive clutch, as disclosed further herein.

Additionally, outer cover 44' may be comprised of a metallic material and/or a polymeric material, such as an injection-moldable plastic. As shown best in FIG. 16, and disclosed further herein, outer cover 44' generally follows the shape and contour of the drive and driven clutches which may increase air shear and improve heat transfer because the outer surface of outer cover 44' is closely positioned to the sheaves of the drive and driven clutches.

Referring to FIGS. 12-14B, CVT housing 40' includes a plurality of air intakes or inlet ports 46' for receiving air to cool CVT 34' and a single air outlet port 48' to exhaust warm or hot air from CVT 34'. Illustratively, housing 40' includes two air inlet ports 46*a'* and 46*b'*, where a first air inlet port 46*a'* is positioned on inner cover 42' and a second air intlet port 46*b'* is positioned on outer cover 44'. In one embodiment, first air inlet port 46*a'* (FIG. 13) is positioned adjacent the drive clutch and second air inlet port 46*b'* is positioned adjacent the driven clutch, thereby balancing the distribution of cooler ambient air on both sides of the CVT belt. First inlet port 46*a'* is sealingly coupled to a first intake duct 50*a'* positioned along inner cover 42' and second inlet port 46*b'* is sealingly coupled to a second intake duct **50*b*' positioned along a portion of outer cover 44'**.

Additionally, outlet port 48' is sealingly coupled to an outlet duct 52' to expel hot air from CVT 34'. As shown in FIGS. 12-14B, outlet port 48' is positioned on inner cover 42' at a position generally adjacent the driven clutch and, in this way, inner cover 42' of CVT 34' includes first air inlet port **46*a*' positioned generally adjacent the drive clutch and outlet port 48' positioned generally adjacent the driven clutch. Illustratively, outlet port 48' is not centered on the CVT belt, but rather, is biased or otherwise positioned inboard of at least a portion of the CVT belt towards rear surface 56' of inner cover 42'**.

Figure 15:
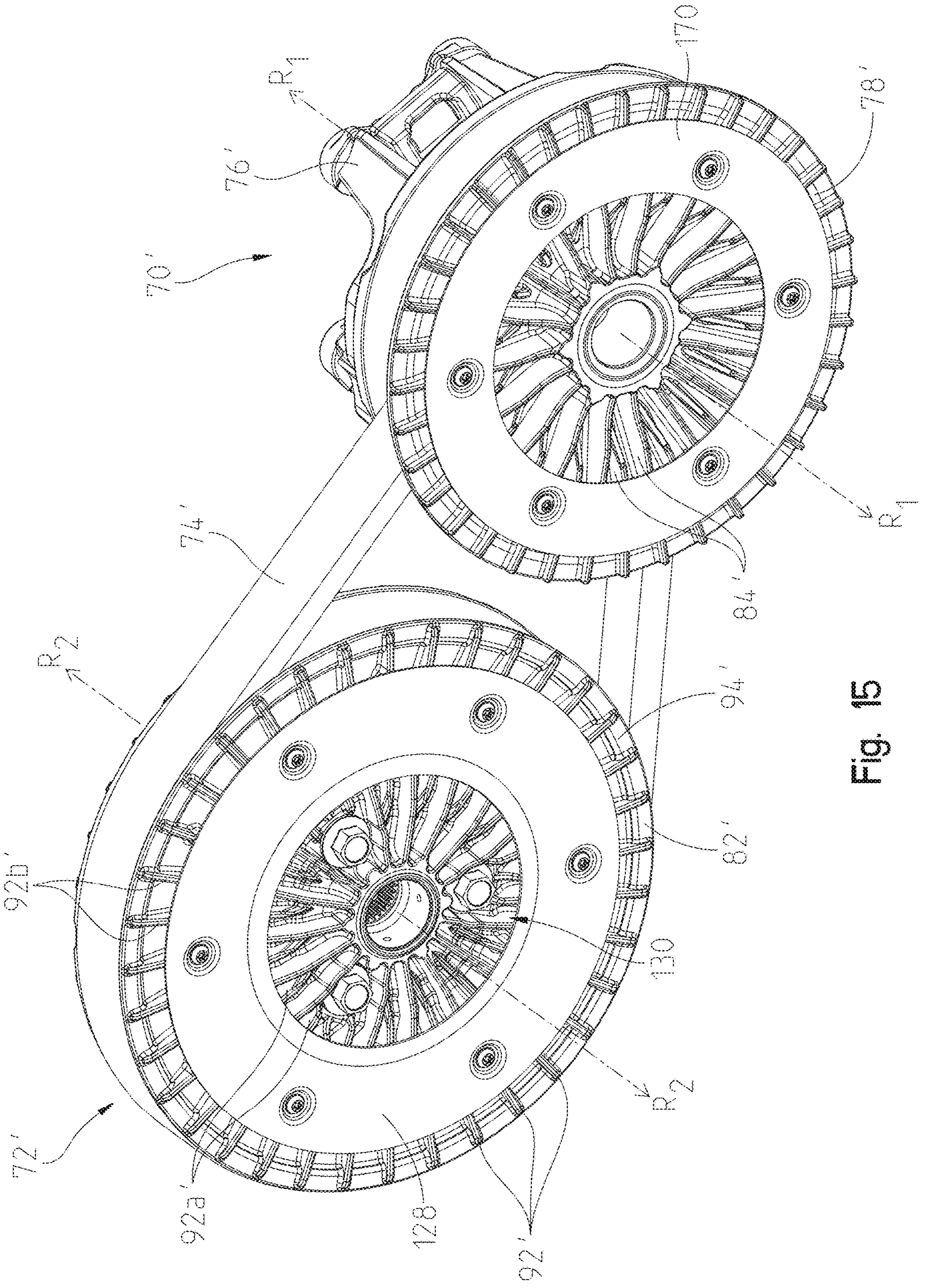
FIG. 15 is a front perspective view of a drive clutch, a driven clutch, and a belt of the CVT of FIG. 14A.
Figure 16:
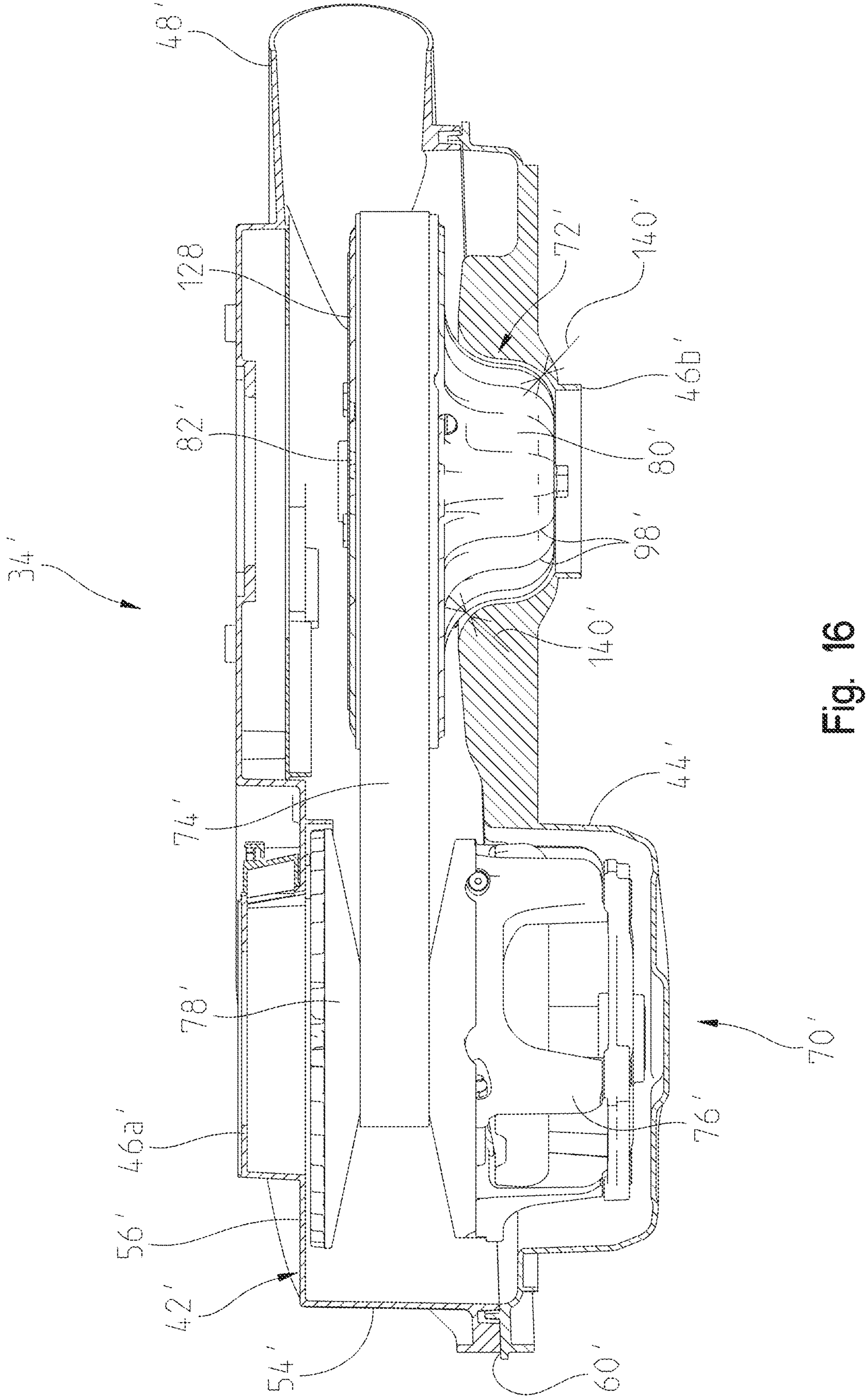
FIG. 16 is a cross-sectional view of the CVT of FIG. 12, taken along line 16-16 of FIG. 12.

Referring now to FIGS. 15 and 16, CVT 34' includes a primary or drive clutch or pulley 70', a secondary or driven clutch or pulley 72', and a belt 74' extending therebetween. Drive clutch 70' is rotatably coupled to a crankshaft (not shown) of engine 32' (FIG. 11A). Driven clutch 72' is rotatably coupled to an input shaft (not shown) of transmission 35 and is rotatably coupled to drive clutch 70' through belt 74'. Belt 74' may be comprised of a polymeric material, for example rubber, and may also include reinforcing members, such as metal cords or other reinforcing material. In one embodiment, belt 74' may be comprised of a metallic material, for example, belt 74' may be a chain. In cross-section, belt 74' may generally define a "V" shape. Belt 74' is configured to contact drive clutch 70' and, in one embodiment, expand in diameter in order to contact driven clutch 72'.

As shown in FIGS. 15 and 16, drive clutch 70' includes a moveable sheave 76' positioned adjacent outer cover 44' of CVT 34' and a stationary sheave 78' positioned adjacent inner cover 42' of CVT 34'. During operation of CVT 34', stationary sheave 78' maintains a fixed position and does not move relative to moveable sheave 76'. Conversely, moveable sheave 76' of drive clutch 70' is configured for axial movement relative to stationary sheave 78' in order to engage belt 74' and effect various drive ratios. The axial movement of moveable sheave 76' may occur generally in a direction perpendicular or parallel to longitudinal axis L (FIG. 1). Additional details of drive clutch 70' may be disclosed in U.S. Pat. No. 9,566,858, issued on Feb. 14, 2017 and U.S. patent application Ser. No 15/388,106, filed Dec. 22, 2016, the complete disclosures of which are expressly incorporated by reference herein.

Referring still to FIGS. 15 and 16, the rotation of belt 74' caused by drive clutch 70' drives driven clutch 72'. Driven clutch 72' includes a stationary sheave 80' positioned adjacent outer cover 44' and a moveable sheave 82' positioned adjacent inner cover 42'. Stationary sheave 80' is coupled to a shaft of transmission 35 (FIG. 11A) and maintains a fixed position relative to moveable sheave 82'. Moveable sheave 82' may be configured for axial translational movement between a closed position when adjacent stationary sheave 80' and an open position in which moveable sheave 82' slides or otherwise moves axially apart from stationary sheave 80'. The movement of moveable sheave 82' engages belt 74' in various configurations in order to effect various driving ratios for vehicle 2. Additional details of driven clutch 72' may be disclosed in U.S. Pat. No. 9,566,858, issued on Feb. 14, 2017 and U.S. patent application Ser. No 15/388,106, filed Dec. 22, 2016, the complete disclosures of which are expressly incorporated by reference herein.

During operation of CVT 34', drive clutch 70' engages belt 74' and when belt 74' engages driven clutch 72', driven clutch 72' rotates, which causes the shaft of transmission 35 to rotate. More particularly, drive clutch 70' rotates with the crankshaft of engine 32' and the rotation thereof drives rotation of driven clutch 72' through rotation of belt 74'. Depending on the operating conditions of vehicle 2, moveable sheaves 76', 82' of drive clutch 70' and driven clutch 72', respectively, may be moved relative to stationary sheaves 78', 80' to adjust driving ratios for vehicle 2. During movement of moveable sheaves 76', 82', belt 74' is configured to move between a starting position and a high-ratio position. Movement of moveable sheaves 76', 82' may be electronically, mechanically, or fluidly controlled.

With respect still to FIGS. 15 and 16, as CVT 34' is operating, heat is generated and the temperature within housing 40' increases. As such, it is necessary to cool CVT 34' during operation thereof. In general, CVT 34' is cooled by providing ambient air within housing 40'. Housing 40' and any of sheaves 76', 78', 80', 82' may be specifically configured for increased cooling. For example, as disclosed herein, the configuration of outer cover 44' generally follows the contour of sheaves 76', 80' such that air shear and heat transfer are increased due to close positioning of outer cover 44' relative to sheaves 76', 80'. Illustratively, a distance 140' is defined between the outermost surface of stationary sheave 80' of driven clutch 72' and an innermost surface of outer cover 44' and distance 140' is not equal at all portions of outer cover 44' adjacent stationary sheave 80' of driven clutch 72'. Rather, in one embodiment, distance 140' may be approximately 6 mm at a position adjacent bell portion 102' of stationary sheave 80' and distance 140' may be approximately 10 mm at a position adjacent planar portion 104' of outer sheave face 100' of stationary sheave 80'. As shown best in FIG. 20, distance 140' remains generally constant between the outermost surface of stationary sheave 80' of driven clutch 72' and the innermost surface of outer cover 44' until a tapered region 180 of outer cover 44'. At tapered region 180 of outer cover 44', a distance between the innermost surface of outer cover 44' and the outermost surface of stationary sheave 80' may increase.

As shown in FIG. 15, with respect to the configuration of sheaves 76', 78', 80', 82', at least some of sheaves 76', 78', 80', 82' have an increased surface area due to the inclusion of fins. Illustratively, at least stationary sheave 78' of drive clutch 70' includes fins 84 extending radially outward from an axis of rotation $R_1$ of drive clutch 70', as is similarly disclosed herein with respect to stationary sheave 78 of FIGS. 6A-6C. By including fins 84 on stationary sheave 78', the surface area of sheave 78' is increased. In this way, the surface of sheave 78' which may be exposed to ambient air entering housing 40' is increased, thereby allowing for increased efficiencies when cooling stationary sheave 78' and removing heat from belt 74'.

Referring still to FIG. 15, moveable sheave 82' of driven clutch 72' also may include a plurality of fins 92' extending radially outward in a direction perpendicular to an axis of rotation $R_2$ of driven clutch 72' and extending outward from a body portion or outer sheave face 94' in the direction of axis of rotation $R_2$. Illustrative moveable sheave 82' may include a total of 36 fins 92', however, moveable sheave 82' may include any number of fins 92'. In one embodiment, an angular distance between fins 92' may be approximately equal to or less than 15 degrees and, other embodiments, the angular distance between fins 92' may be approximately 6-10 degrees if the number of fins 92' is increased. A first portion **92*a*' of fins 92' has a length less than a length of a second portion 92*b*' of fins 92'. It may be appreciated that fins 92' do not extend radially outwardly to a position which would interfere with or contact inner cover 42' of housing 40'**.

In one embodiment, first portion 92*a*' includes 18 fins 92' and second portion 92*b*' includes 18 fins 92'. As such, moveable sheave 82' of driven clutch 72' may include a total of 36 fins 92'. However, in other embodiments, first and second portions 92*a*', 92*b*' may include different and/or unequal numbers of fins 92' and sheave 82' may include a total number of fins 92' less than or greater than 36. In one embodiment, an angular distance between fins 92' may be approximately equal to or less than 15 degrees and, other embodiments, the angular distance between fins 92' may be approximately 6-10 degrees if the number of fins 92' is increased. By including fins 92' on moveable sheave 82', the surface area of sheave 82' is increased. In this way, the surface of sheave 82' which may be exposed to ambient air entering housing 40' is increased, thereby allowing for increased efficiencies when cooling moveable sheave 82' and removing heat from belt 74'.

Figure 14A:
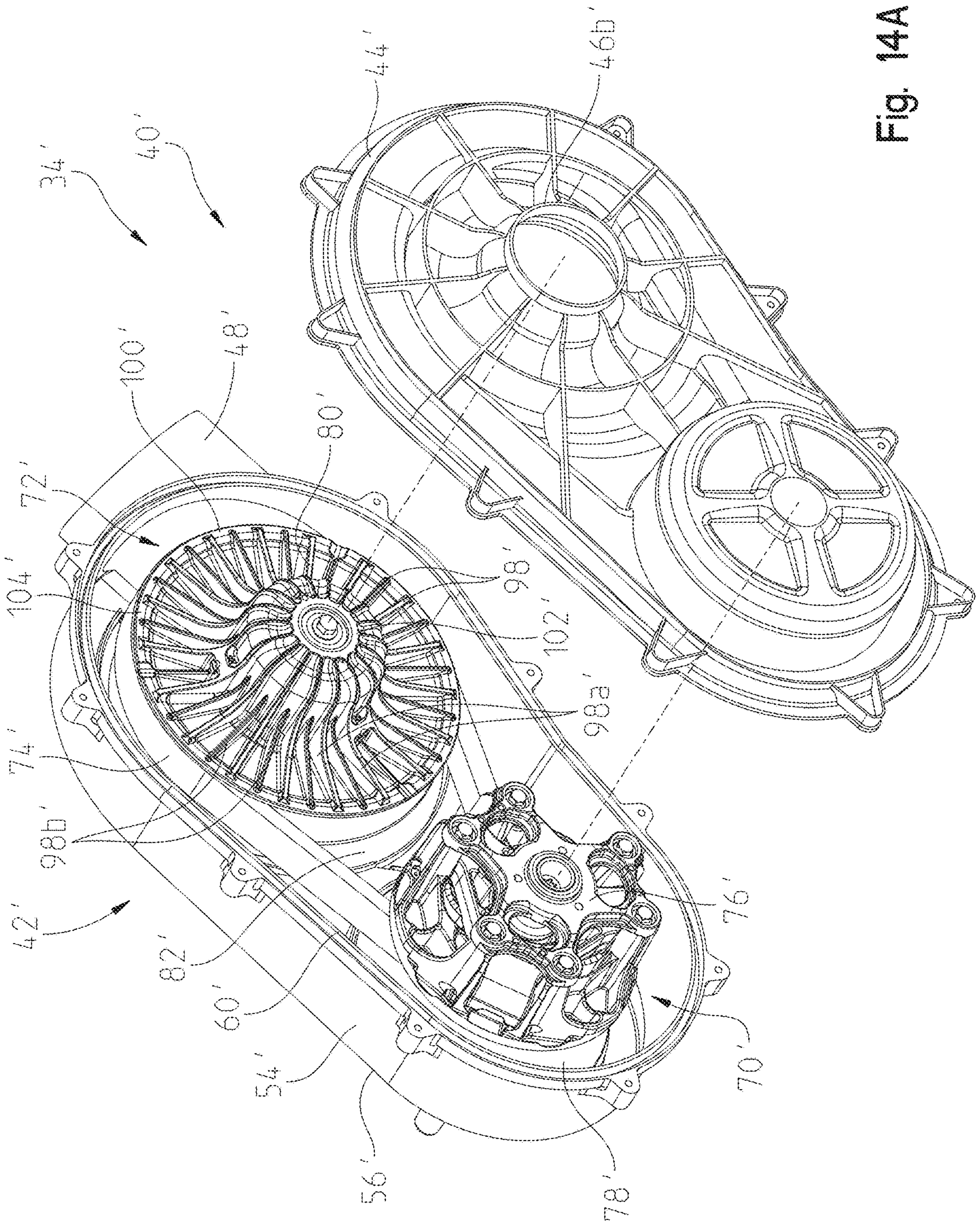
FIG. 14A is an exploded view of the CVT of FIG. 12.
Figure 14B:
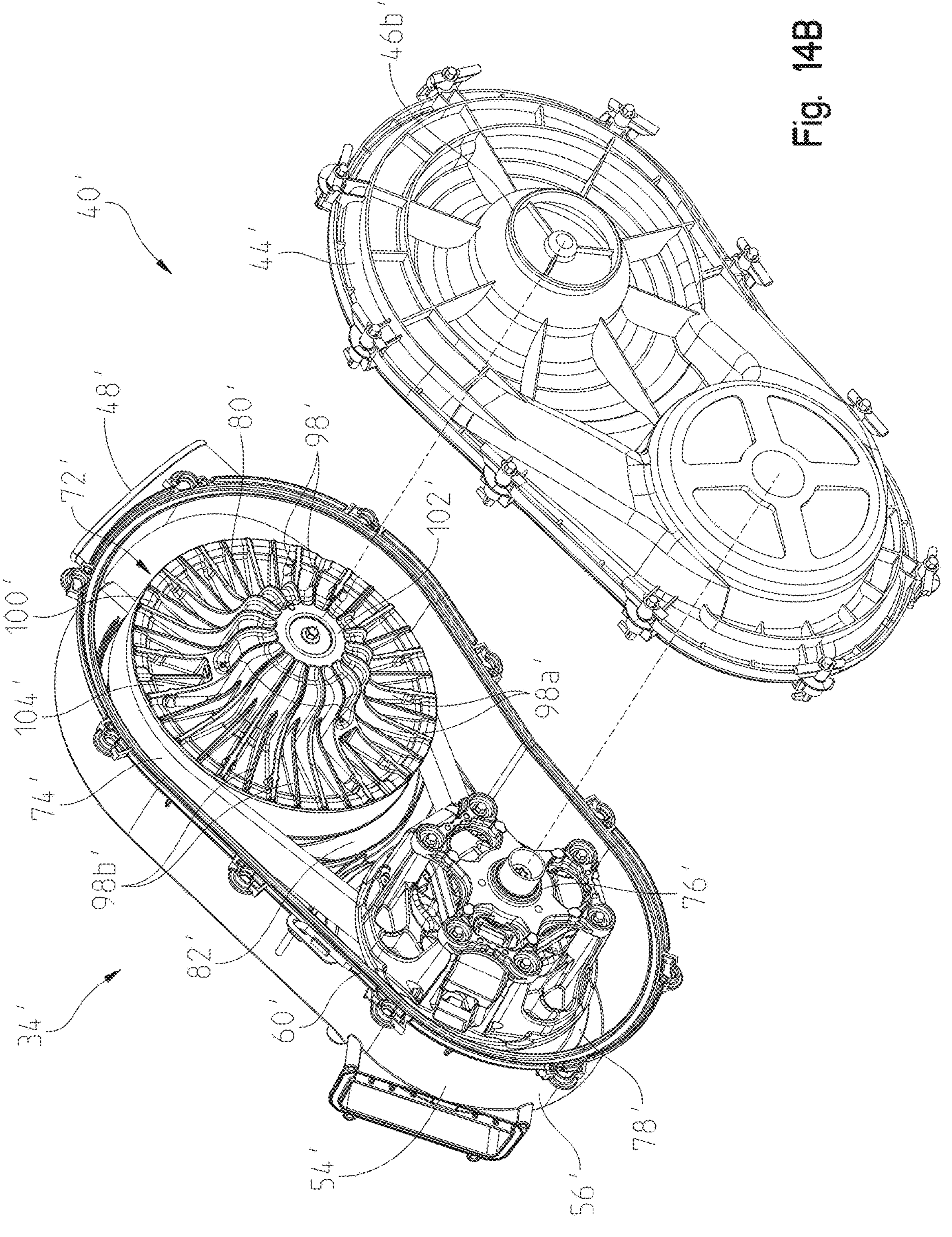
FIG. 14B is an exploded view of the CVT of FIG. 12 with an alternative outer cover or housing.

As shown best in FIGS. 14A and 14B, stationary sheave 80' of driven clutch 72' also includes a plurality of fins 98' extending radially outward in a direction perpendicular to axis of rotation $R_2$ (FIG. 15) of driven clutch 72' and extending outward from a body portion or outer sheave face 100' in the direction of axis of rotation $R_2$. Illustrative stationary sheave 80' may include a total of 36 fins 98', however, stationary sheave 80' may include any number of fins 98'. In one embodiment, an angular distance between fins 98' may be approximately equal to or less than 15 degrees and, other embodiments, the angular distance between fins 98' may be approximately 6-10 degrees if the number of fins 98' is increased. Each of fins 98' may extend continuously between a nose or bell portion 102' and a planar portion 104' of outer sheave face 100'. However, illustratively, fins 98' include a first plurality of fins 98*a*' which extend continuously from bell portion 102' to planar portion 104' and a second plurality of fins 98*b*' which have a radial distance less than that of first plurality of fins 98*a*'. Fins 98' increase the surface area of stationary sheave 80', thereby allowing for increased cooling thereof when ambient air enters housing 40' and removing heat from belt 74'.

In addition to the increased surface area of at least sheaves 78', 80', 82' through respective fins 84', 92', 98', the configuration of housing 40' increases cooling efficiencies of CVT 34' and allows for increased heat removal from belt 74'. More particularly, and referring to FIG. 16, inner cover 42' receives ambient air through intake duct 50*a*' and inlet port 46*a*' and outer cover 44' receives ambient air through intake duct 50*b*' and inlet port 46*b*'. In this way, ambient air is provided to housing 40' at two locations through both inlet ports 46*a*', 46*b*' to increase cooling to drive clutch 70' and driven clutch 72', respectively.

Figure 18A:
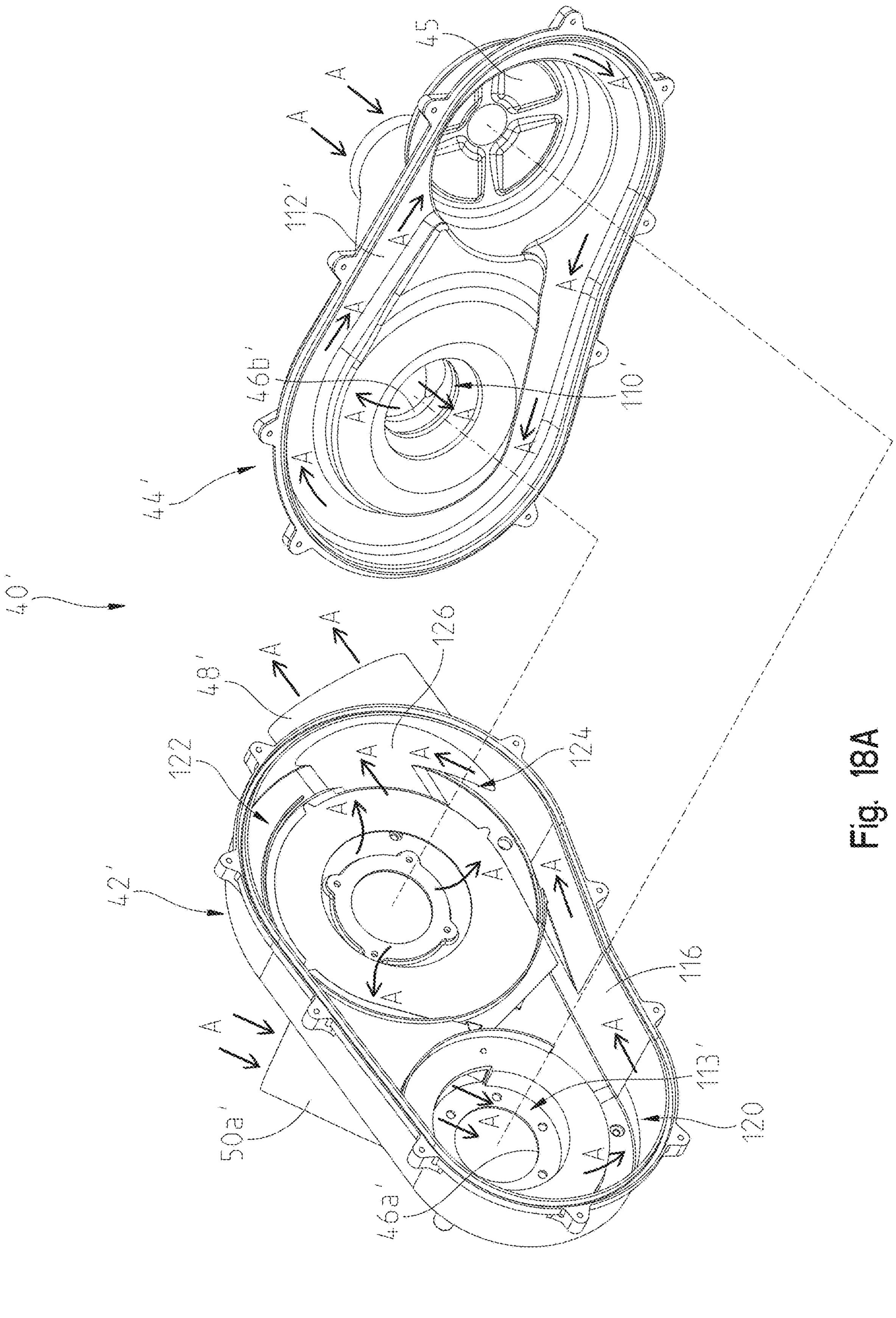
FIG. 18A is an exploded view of the inner cover and an outer cover of the housing of FIG. 14A and including an illustrative air flow path through the housing.
Figure 18B:
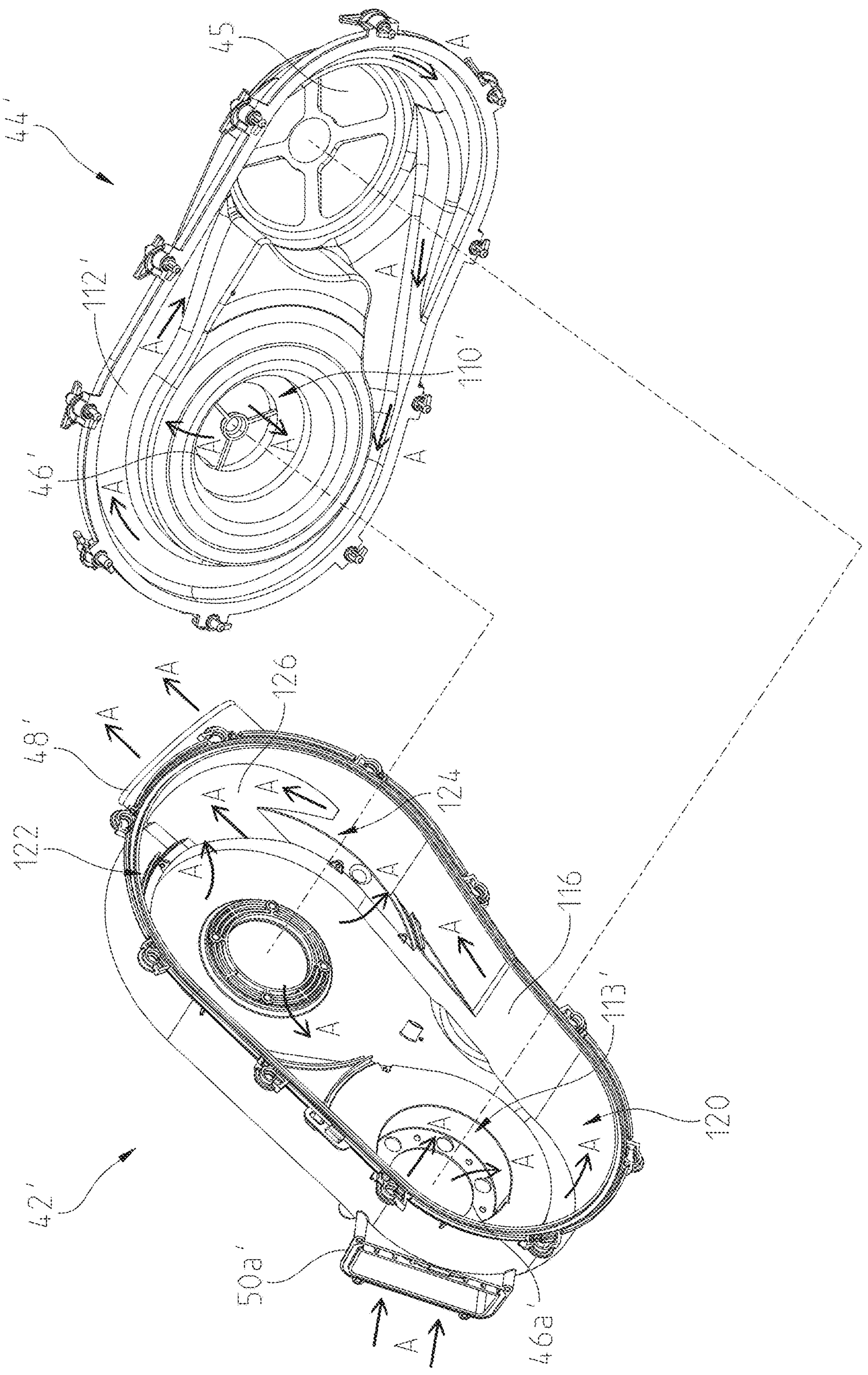
FIG. 18B is an exploded view of the inner cover and outer cover of the housing of FIG. 14B and including an illustrative air flow path through the housing.

FIGS. 18A and 18B illustrate air flow through housing 40', where FIG. 18A illustrates air flow through housing 40' of FIG. 14A and FIG. 18B illustrates air flow through housing 40' of FIG. 14B. As shown in FIGS. 18A-20, with respect to outer cover 44', a first channel 110' directs air A toward stationary sheave 80' of driven clutch 72'. Air A is configured to flow through first channel 110' to cool at least stationary sheave 80' of driven clutch 72' and into a second channel 112' extending around the perimeter of outer cover 44' to direct air A towards drive clutch 70'. More particularly, second channel 112' defines a continuously recessed portion of outer cover 44' and may be configured as a relief channel to relieve pressure that builds within outer cover 44' at a position adjacent drive clutch 70'. For example, if pressure increases at a cover portion 45 (FIGS. 18A and 18B) of outer cover 44' at a position adjacent drive clutch 70', second channel 112' may facilitate relief of such pressure to allow for more efficient pumping of air A through housing 40'. It may be appreciated that second channel 112' of FIG. 18B is deeper (i.e., has more lateral width) than second channel 112' of FIG. 18A. Additionally, first channel 110' of FIG. 18B has a more rounded configuration than first channel 110' of FIG. 18A. In this way, first channel 110' of FIG. 18B has less stepped surfaces than that of FIG. 18A which may increase air transfer closer to drive clutch 72'.

During operation of CVT 34', as air A enters housing 40' through inlet port 46*b*', fins 98' on stationary sheave 80' may fill with air A flowing into first channel 110' and then evacuate air in a radial direction once fins 98' rotate past first channel 110', thereby moving air A about driven clutch 72' and towards second channel 112'. It may be appreciated that inner cover 42' includes a wall or extension member 126 (FIGS. 18A and 18B), which short circuits incoming air A at a position adjacent outlet port 48' to prevent incoming air A from flowing directly out of housing 40' through outlet port 48'. Rather, extension member 126 of FIGS. 18A and 18B directs incoming air A about driven clutch 72'.

As air A flows from first channel 110' and within second channel 112' of outer cover 44', air A flows from driven clutch 72' to drive clutch 70' along an upper surface of outer cover 44' and continues to flow within second channel 112' along a lower surface of outer cover 44' where it is exhausted from housing 40' through outlet port 48' of inner cover 42'. In this way, air A flows into first channel 110' from inlet port 46*b*' on outer cover 44' and the configuration of outer cover 44' allows air A to flow therein to cool both stationary sheave 80' of driven clutch 72' and moveable sheave 76' of drive clutch 70'.

Referring still to FIGS. 18A-20, with respect to inner cover 42', a third channel 113' directs air A toward stationary sheave 78' of drive clutch 70'. Air A is configured to flow through third channel 113' to cool at least stationary sheave 78' of drive clutch 70' and into a fourth channel 116 extending around the perimeter of inner cover 42' to direct air A towards driven clutch 72'. More particularly, fins 84' on stationary sheave 78' may fill with air A flowing into third channel 113' and then evacuate air in a radial direction once fins 84' rotate past third channel 113', thereby moving air A about drive clutch 70' and towards fourth channel 116. As air A flows within fourth channel 116 of inner cover 42', air A flows from drive clutch 70' to driven clutch 72' along a lower surface of inner cover 42' and continues to flow within fourth channel 116 along an upper surface of inner cover 42' where it is exhausted from housing 40' through outlet port 48' of inner cover 42'. In this way, air A flows into third channel 113' from inlet port 46*a*' on inner cover 42' and the configuration of inner cover 42' allows air A to flow therein to cool both stationary sheave 78' of drive clutch 70' and moveable sheave 82' of driven clutch 72'.

Figure 19:
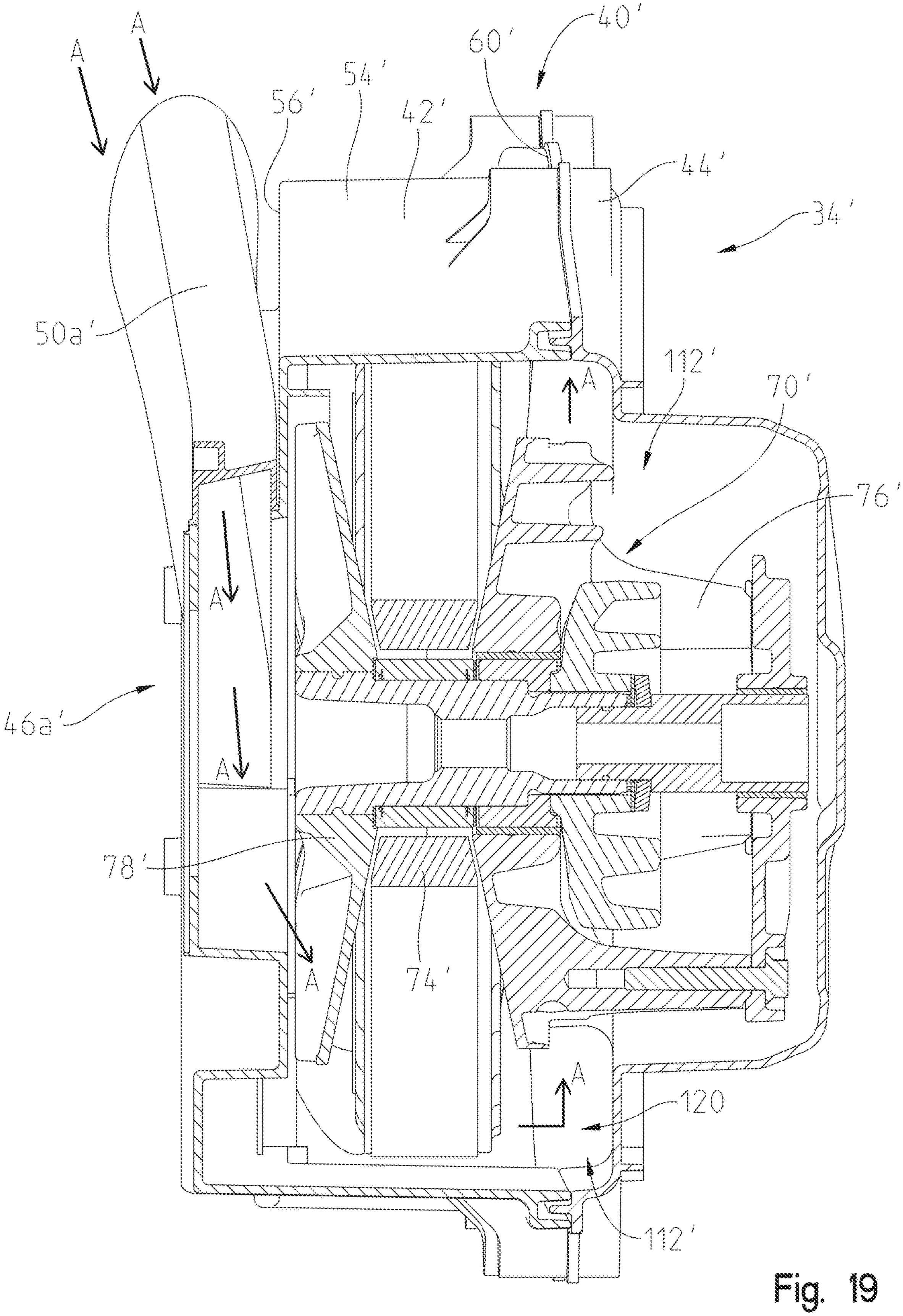
FIG. 19 is a cross-sectional view of the CVT of FIG. 12, taken along line 19-19 of FIG. 12.

The configuration of housing 40' includes a plurality of volutes configured to promote and direct air A to flow within housing 40'. Illustratively, housing 40' includes at least three volutes including a first volute 120, a second volute 122, and a third volute 124. More particularly, as shown in FIGS. 18A, 18B, and 19, first volute 120 is defined by the cooperation of inner and outer covers 42', 44' and, illustratively, is defined by the cooperation of second channel 112' of outer cover 44' and fourth channel 116 of inner cover 42'. As shown, first volute 120 is positioned adjacent a lower portion of inner and outer covers 42', 44' at a location generally adjacent drive clutch 70'. First volute 120 is configured to pump or otherwise drive air A towards a center portion of driven clutch 72' through channels 112', 116. In this way, first volute 120 allows air therein to cool driven clutch 72' rather than merely flowing past it to increase cooling of at least the center portion of driven clutch 72'.

Additionally, and as shown in FIGS. 18A, 18B, and 20, housing 40' includes second volute 122 which is defined by the cooperation of inner and outer covers 42', 44' and, illustratively, is defined by the cooperation of second channel 112' of outer cover 44' and fourth channel 116 of inner cover 42'. As shown, second volute 122 is positioned adjacent an upper portion of inner and outer covers 42', 44' at a location generally adjacent driven clutch 72'. Second volute 122 is configured to pump or otherwise drive or distribute air A towards drive clutch 70' through channels 112', 116. As shown in FIG. 18B, second volute 122 may have a less stepped surface than second volute 122 of FIG. 18A.

As is also shown in FIGS. 18A and 18B, housing 40' includes third volute 124 defined within a lower portion of inner cover 42' along an inboard portion of fourth channel 116. Illustratively, third volute 124 is positioned generally adjacent driven clutch 72' and outlet port 48' and is configured to pump or otherwise drive or direct hot air A within housing 40' outwardly through outlet port 48' and outlet duct 52'.

In addition to volutes 120, 122, 124 for directing air A through housing 40', at least moveable sheave 82' of driven clutch 72' includes a windage plate 128 coupled thereto, as shown best in FIGS. 15 and 20. More particularly, windage plate 128 may be coupled to fins 92'. Windage plate 128 is configured to promote cooling to at least moveable sheave 82' by pulling air A through a center opening 130 thereof to allow for efficient cooling of moveable sheave 82' when at different axial positions. It may be appreciated that sheaves 76', 78', and/or 80' also may include a windage plate or similar feature to promote further cooling thereof. For example, a windage plate 170 also may be included on stationary sheave 78' of drive clutch 70', as shown in FIG. 15.

Additional details of vehicle 2 and/or the powertrain assembly may be disclosed in U.S. patent application Ser. No. 15/388,436, filed Dec. 22, 2016; U.S. patent application Ser. No. 15/388,106, filed Dec. 22, 2016; and U.S. Patent Application Ser. No. 62/613,796, filed Jan. 5, 2018, the complete disclosures of which are expressly incorporated by reference herein.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A vehicle comprising:

a frame;

a plurality of ground engaging members supporting the frame;

a power source supported by the frame and operatively coupled to at least one of the plurality of ground engaging members;

a CVT coupled to the power source;

a shiftable transmission coupled to the power source;

a bell housing integrally formed with a housing of the shiftable transmission; and a carrier bearing positioned intermediate the bell housing and a drive clutch of the CVT, the carrier bearing including a bearing housing including a nose that extends into a housing of the CVT.

2. The vehicle of claim 1, wherein the bell housing includes an opening configured to allow coupling between a crankshaft of the power source and the drive clutch of the CVT, and wherein the carrier bearing is at least partially received within the opening of the bell housing.

3. The vehicle of claim 2, wherein the carrier bearing includes a rolling element bearing received within the nose of the bearing housing and a lip seal received within the nose, the lip seal including a body portion positioned within the nose and a wiper positioned axially outward of the nose.

4. The vehicle of claim 1, wherein the bell housing is configured to support the CVT at a location having a distance greater than a predetermined distance from the power source.

5. The vehicle of claim 4, wherein the bell housing is coupled to the CVT such that the CVT is spaced from the power source to define a space and a drive inlet is positioned between the CVT and the power source in the space.

6. The vehicle of claim 5, wherein the space between the power source and the CVT is configured to facilitate air flow along an inner side of the CVT.

7. The vehicle of claim 6, wherein the space is configured to facilitate air flow adjacent a drive clutch of the CVT.

8. The vehicle of claim 1, wherein the bell housing integrally formed with the housing of the shiftable transmission such that the bell housing and the housing of the shiftable transmission are a single component.

9. The vehicle of claim 8, wherein the shiftable transmission is configured to be operably coupled with a driven clutch of the CVT through an input shaft of the shiftable transmission, and the shiftable transmission includes an output shaft configured to be coupled to a drive member for providing motive power to at least one of the plurality of ground engaging members.

10. The vehicle of claim 1, wherein at least a portion of the nose of the bearing housing is positioned within the housing of the CVT adjacent the drive clutch.

11. The vehicle of claim 1, wherein the housing of the CVT includes an inner cover and an outer cover removably coupled to the inner cover, and the nose of the bearing housing extends through the inner cover into an interior of the housing of the CVT.

* * * * *